United States Patent
Park et al.

(10) Patent No.: US 12,014,571 B2
(45) Date of Patent: Jun. 18, 2024

(54) METHOD AND APPARATUS WITH LIVENESS VERIFICATION

(71) Applicant: Samsung Electronics Co., Ltd., Suwon-si (KR)

(72) Inventors: SungUn Park, Suwon-si (KR); Hyeongwook Yang, Suwon-si (KR); Tushar Balasaheb Sandhan, Suwon-si (KR); Jiaqian Yu, Beijing (CN); Jingtao Xu, Beijing (CN); Youngjun Kwak, Seoul (KR); Juwoan Yoo, Anyang-si (KR); Jae Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 17/333,915

(22) Filed: May 28, 2021

(65) Prior Publication Data

US 2021/0287026 A1 Sep. 16, 2021

Related U.S. Application Data

(63) Continuation of application No. 16/268,792, filed on Feb. 6, 2019, now Pat. No. 11,023,757.

(30) Foreign Application Priority Data

Feb. 14, 2018 (KR) .................. 10-2018-0018795
Feb. 28, 2018 (KR) .................. 10-2018-0024891

(51) Int. Cl.
*G06K 9/00* (2022.01)
*G06F 18/211* (2023.01)
(Continued)

(52) U.S. Cl.
CPC .......... *G06V 40/168* (2022.01); *G06F 18/211* (2023.01); *G06F 18/251* (2023.01);
(Continued)

(58) Field of Classification Search
CPC .......... G06N 20/00; G06N 3/08; G06N 3/045; G06N 20/20; G06N 3/044; G06N 5/01;
(Continued)

(56) References Cited

U.S. PATENT DOCUMENTS 6,032,125 A * 2/2000 Ando ............... G06Q 30/02
705/28
7,254,255 B2 8/2007 Dennis
(Continued)

FOREIGN PATENT DOCUMENTS

| JP | 2008-108243 A | 5/2008 |
| JP | 2017-191374 A | 10/2017 |
| KR | 10-2015-0069799 A | 6/2015 |

OTHER PUBLICATIONS

Korean Office Action dated Jul. 4, 2022, in counterpart Korean Patent Application No. 10-2018-0024891 (5 pages in English and 7 pages in Korean).

*Primary Examiner* — Alex Kok S Liew
(74) *Attorney, Agent, or Firm* — NSIP Law

(57) ABSTRACT

Provided is a liveness verification method and device. A liveness verification device acquires a first image and a second image, and select one or more liveness models based on respective analyses of the first image and the second image, including analyses based on an object part being detected in the first image and/or the second image, and to verify, using the selected one or more liveness models, a liveness of the object based on the first image and/or the second image. The first image may be a color image and the second image may be an Infrared image.

20 Claims, 15 Drawing Sheets

(51) Int. Cl.
*G06F 18/25* (2023.01)
*G06V 10/80* (2022.01)
*G06V 40/16* (2022.01)
*G06V 40/18* (2022.01)
*G06V 40/40* (2022.01)

(52) U.S. Cl.
CPC .......... *G06F 18/253* (2023.01); *G06V 10/803* (2022.01); *G06V 40/193* (2022.01); *G06V 40/45* (2022.01); *G06V 40/161* (2022.01)

(58) Field of Classification Search
CPC .......... G06N 7/01; G06N 3/084; G06N 20/10; G06N 3/04; G06N 5/04; G06N 3/088; G06N 3/047; G06N 5/022; G06N 3/006; G06N 3/048; G06N 5/02; G06N 3/082; G06N 3/02; G06N 5/046; G06N 5/025; G06N 3/049; G06N 3/126; G06N 3/063; G06N 3/042; G06N 5/045; G06N 7/00; G06N 5/00; G06N 5/048; G06N 5/043; G06N 3/10; G06N 3/086; G06N 3/105; G06N 5/041; G06N 3/0464; G06N 3/065; G06N 3/09; G06N 3/004; G06N 7/02; G06N 3/008; G06N 3/0895; G06N 3/0442; G06N 7/023; G06N 7/08; G06N 3/043; G06N 3/0455; G06N 10/00; G06N 3/00; G06N 3/096; G06N 3/123; G06N 3/092; G06N 5/027; G06N 5/047; G06N 7/046; G06N 10/70; G06N 3/0418; G06N 3/0475; G06N 3/067; G06N 3/094; G06N 3/098; G06N 3/0985; G06N 99/00; G06N 10/20; G06N 3/002; G06N 3/0463; G06N 3/06; G06N 3/12; G06N 5/013; G06N 5/042

See application file for complete search history.

(56) References Cited

U.S. PATENT DOCUMENTS

| | | |
|---|---|---|
| 7,508,960 B1 | 3/2009 | Bolle et al. |
| 8,374,404 B2 | 2/2013 | Williams et al. |
| 9,495,526 B2 | 11/2016 | Hanna |
| 9,594,969 B1 | 3/2017 | Negi et al. |
| 9,785,823 B2 | 10/2017 | Mather et al. |
| 9,811,730 B2 | 11/2017 | Komogortsev |
| 9,848,113 B2 | 12/2017 | Smits et al. |
| 2008/0273768 A1 | 11/2008 | Dennis et al. |
| 2013/0015946 A1* | 1/2013 | Lau .................. G06V 40/172 340/5.2 |
| 2014/0071293 A1 | 3/2014 | Unnikrishnan |
| 2015/0245767 A1 | 9/2015 | Northcott et al. |
| 2016/0019421 A1* | 1/2016 | Feng .................. G06V 40/18 382/117 |
| 2016/0088241 A1 | 3/2016 | Sung et al. |
| 2017/0004352 A1 | 1/2017 | Jonsson et al. |
| 2017/0091550 A1 | 3/2017 | Feng et al. |
| 2017/0257770 A1 | 9/2017 | Derakhshani |
| 2017/0316243 A1* | 11/2017 | Ghavanini ......... G06V 40/1382 |
| 2017/0337440 A1 | 11/2017 | Green et al. |
| 2017/0344793 A1 | 11/2017 | Xue et al. |
| 2018/0225495 A1* | 8/2018 | Jonsson .................. G06V 10/17 |

* cited by examiner

METHOD AND APPARATUS WITH LIVENESS VERIFICATION

CROSS-REFERENCE TO RELATED APPLICATIONS

This application is a continuation of Ser. No. 16/268,792, filed on Feb. 6, 2019 and claims the benefit under 35 USC § 119(a) of Korean Patent Application No. 10-2018-0018795 filed on Feb. 14, 2018 and Korean Patent Application No. 10-2018-0024891 filed on Feb. 28, 2018 in the Korean Intellectual Property Office, the entire disclosure of which is incorporated herein by reference for all purposes.

BACKGROUND

1. Field

The following description relates to technology for verifying a liveness of an object.

2. Description of Related Art

In a user authentication system, a computing device may determine whether to allow an access to the computing device based on authentication information that is provided from a user. The authentication information may include a password input from the user, biometric information of the user, and the like. The biometric information may include information associated with a fingerprint, an iris, and/or a face, for example.

Also, anti-spoofing techniques verify whether a face of a user input to a computing device is a fake face or a genuine face. To this end, features, such as local binary patterns (LBPs), histogram of oriented gradients (HOG), and difference of Gaussians (DoG), may be extracted from an input image and the computing device may determine whether the input face is a fake face based on the extracted features. Face spoofing attempts have been made using photos, moving pictures, masks, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented liveness verification method includes obtaining a first image and a second image, selecting one or more liveness models based on respective analyses of the first image and the second image, including analyses based on an object part being detected in the first image and/or the second image, and verifying, using the selected one or more liveness models, a liveness of the object based on the first image and/or the second image.

The selecting of the one or more liveness models may include selecting any one or any combination of a first verification model and a second verification model, respectively as the one or more liveness models, in response to detecting a target part or the object part in the first image and the target part in the second image.

The selecting of the any one or any combination of the first verification model and the second verification model may be in response to the detecting the target part in the first image and the target part in the second image, when the target part is the object part.

The selecting of the one or more liveness models may include selecting at least the second verification model in response to the detecting of the target part in the first image and the second image, and the verifying of the liveness of the object may be performed using the second verification model that considers the target part detected in the first image and the target part detected in the second image.

The first image may be a color image and the second image may be an Infrared image.

The selecting of the one or more liveness models may include selecting plural liveness models, the plural liveness models may further include at least one other second verification model, as one or more second verification models configured to calculate at least one second liveness score in consideration of any one or any combination of any two or more of an object region patch of the second image, a first target region patch of the second image, and a second target region patch of the second image, and the verifying of the liveness of the object may be performed in further consideration of the at least one second liveness score.

The selecting of the one or more liveness models may include selecting plural liveness models, the plural liveness models may further include at least the first verification model, as one or more first verification models configured to calculate at least one first liveness score in consideration of any one or any combination of any two or more of an entire region patch of the first image, an object region patch of the first image, and/or a determined region of interest (ROI) patch of the first image, and the verifying of the liveness of the object may be performed in further consideration of the at least one first liveness score.

The target part may be an eye, and the object part may be a face or portion of the face including facial parts in addition to the eye.

The verifying of the liveness of the object may include verifying the liveness of the object based on any one or any combination of a first liveness score that is calculated based on a first verification model from a first image patch corresponding to the object part or a target part detected in the first image and a second liveness score that is calculated based on a second verification model from a second image patch corresponding to the object part or the target part detected in the second image.

The verifying of the liveness of the object may be based on the first liveness score and the second liveness score.

The first image may be a color image and the second image may be an Infrared image.

The target part may be an eye, and the object part may be a face or portion of the face including facial parts in addition to the eye.

The verifying of the liveness of the object may include calculating the second liveness score from any one or any combination of any two or more of an object region patch, a first target region patch, and a second target region patch of the second image, based on the second verification model.

The verifying of the liveness of the object may include calculating the first liveness score from an entire region patch, an object region patch, and a region of interest (ROI) patch of the first image, based on the first verification model.

The verifying of the liveness of the object may include calculating the second liveness score from any one or any combination of any two or more of an object region patch, a first target region patch, and a second target region patch of the second image, based on the second verification model.

The selecting of the one or more liveness models may include selecting a part comparison model, as one of the one or more liveness models, in response to a target part being determined located in a desired region of the first image.

The verifying of the liveness of the object may include verifying a liveness of the object from a first image patch corresponding to a target part and a second image patch corresponding to the target part based on a part comparison model.

The target part may be distinguished from the object part.

The verifying of the liveness of the object may include extracting a first part feature from the first image patch based on a feature extraction model of the part comparison model, extracting a second part feature from the second image patch based on the feature extraction model, and verifying the liveness of the object based on a difference between the extracted first part feature and the extracted second part feature.

The verifying of the liveness of the object may include verifying the liveness of the object from differential information between the first image patch and the second image patch based on the part comparison model.

The verifying of the liveness of the object may include verifying the liveness of the object based on a determined correlation level between a first image patch corresponding to a target part extracted from the first image and a second image patch determined in response to the first image patch.

The method may further include acquiring a color image as the first image and acquiring an infrared (IR) image as the second image, wherein the selecting of the one or more liveness models may include selecting a color verification model, as one of the one or more liveness models, in response to detecting a target part in the color image, and selecting an IR region model, as another one of the one or more liveness models, in response to the target part being located outside a desired region of the color image and at least a portion of the object being located in the desired region.

The selecting of the color verification model may include selectively, dependent on a detecting of a pupil of the object in the second image, performing the selecting of the color verification model or performing a selecting of a pupil model without selecting the color verification model, and, when the selecting selects the pupil model, the verifying of the liveness of the object may include verifying the liveness of the object from a pupil patch corresponding to the pupil based on the pupil model.

In response to the pupil of the object not being detected in the second image, the selecting of the color verification model may include selecting to perform the selecting of the color verification model and selecting an IR verification model, as still another one of the one or more liveness models, and the verification of the liveness of the object may be based on image patches from both the first image and the second image.

The selecting of the IR region model may further include, when the at least portion of the object is determined to be located in the desired region, selecting plural verification models in the selecting of the one or more liveness models by performing the selecting of the IR region model in combination with the selecting of the color verification model or selecting of another color verification model, and, when the at least portion of the object is determined to not be located in the desired region, selecting a select color verification model in the selecting of the one or more liveness models by selecting the color verification model or selecting the other color verification model without selecting the IR region model.

The selecting of the one or more liveness models may include selecting a pupil model, as one of the one or more liveness models, in response to detecting a pupil of the object in the second image, and the verifying of the liveness of the object may include verifying the liveness of the object from a pupil patch corresponding to the pupil based on the pupil model.

The verifying of the liveness of the object may include increasing a liveness threshold for a liveness score, calculated based on at least one of the one or more liveness models for consideration in a current verifying of the liveness of the object, in response to previous performances of the verifying of the liveness of the object failing a preset number of times.

The method may further include determining a first threshold as the liveness threshold in response to a target part being determined absent in the second image, determining a second threshold less than the first threshold as the liveness threshold in response to a single target part being located in the second image, determining a third threshold less than the second threshold as the liveness threshold in response to a plurality of target parts being located in the second image, determining a fourth threshold less than the third threshold as the liveness threshold in response to detecting a single pupil in the second image, and determining a fifth threshold less than the fourth threshold as the liveness threshold in response to detecting a plurality of pupils in the second image.

The verifying of the liveness of the object may include determining fake information and a liveness score of the object from the first image and the second image based on a liveness model of the one or more liveness models.

The verifying of the liveness of the object may include determining respective fake information and liveness scores for the object from the first image and/or the second image respectively based on the one or more liveness models.

The verifying of the liveness of the object may include calculating a liveness score, using a first liveness model as one of the one or more liveness models, from a first image patch corresponding to the object part detected in the first image and/or a second image patch corresponding to the object part detected in the second image, determining that the first image and/or the second image are images of a real object in response to the liveness score being determined to meet a liveness threshold, and determining that the first image and/or the second image include of a fake object in response to the liveness score not meeting the liveness threshold.

The verifying of the liveness of the object may include verifying the liveness of the object from plural image patches respectively corresponding to different eyes of the object in the second image, using a liveness model as one of the one or more liveness models.

In one general aspect, provided is a non-transitory computer-readable storage medium storing instructions that, when executed by a processor, cause the processor to perform any operation or combination of operations or methods described herein.

In one general aspect, a processor-implemented liveness verification method includes extracting a first image patch corresponding to an object part from a first image, extracting a second image patch corresponding to the object part from a second image, and verifying a liveness of an object based on differential information between the first image patch and the second image patch.

The first image patch may be a color image patch and the second image patch may be an Infrared image patch.

The object part from the first image may be an eye detected in the first image and the object part from the second image may be an eye detected in the second image.

In one general aspect, a liveness verification device includes one or more image acquirers configured to acquire a first image and a second image, and a processor configured to select one or more liveness models based on respective analyses of the first image and the second image, including analyses based on an object part being detected in the first image and/or the second image, and to verify, using the selected one or more liveness models, a liveness of the object based on the first image and/or the second image.

For the selecting of the one or more liveness models, the processor may be configured to select a first verification model and a second verification model, respectively as the one or more liveness models, in response to detecting a target part or the object part in the first image and the object part or the target part in the second image.

For the selecting of the one or more liveness models, the processor may be further configured to select a part comparison model, and, for the verifying of the liveness of the object, the processor may be further configured to perform the verifying of the liveness of the object using the part comparison model provided a first image patch of an eye of the first image and a second image patch of an eye of the second image.

For the selecting of the one or more liveness models, the processor may be configured to select a part comparison model, and, for the verifying of the liveness of the object, the processor may be configured to perform the verifying of the liveness of the object using the part comparison model provided a first image patch of an eye of the first image and a second image patch of an eye of the second image.

The first image may be a color image and the second image may be an Infrared image.

Other features and aspects will be apparent from the following detailed description, the drawings, and the claims.

Figure 1:
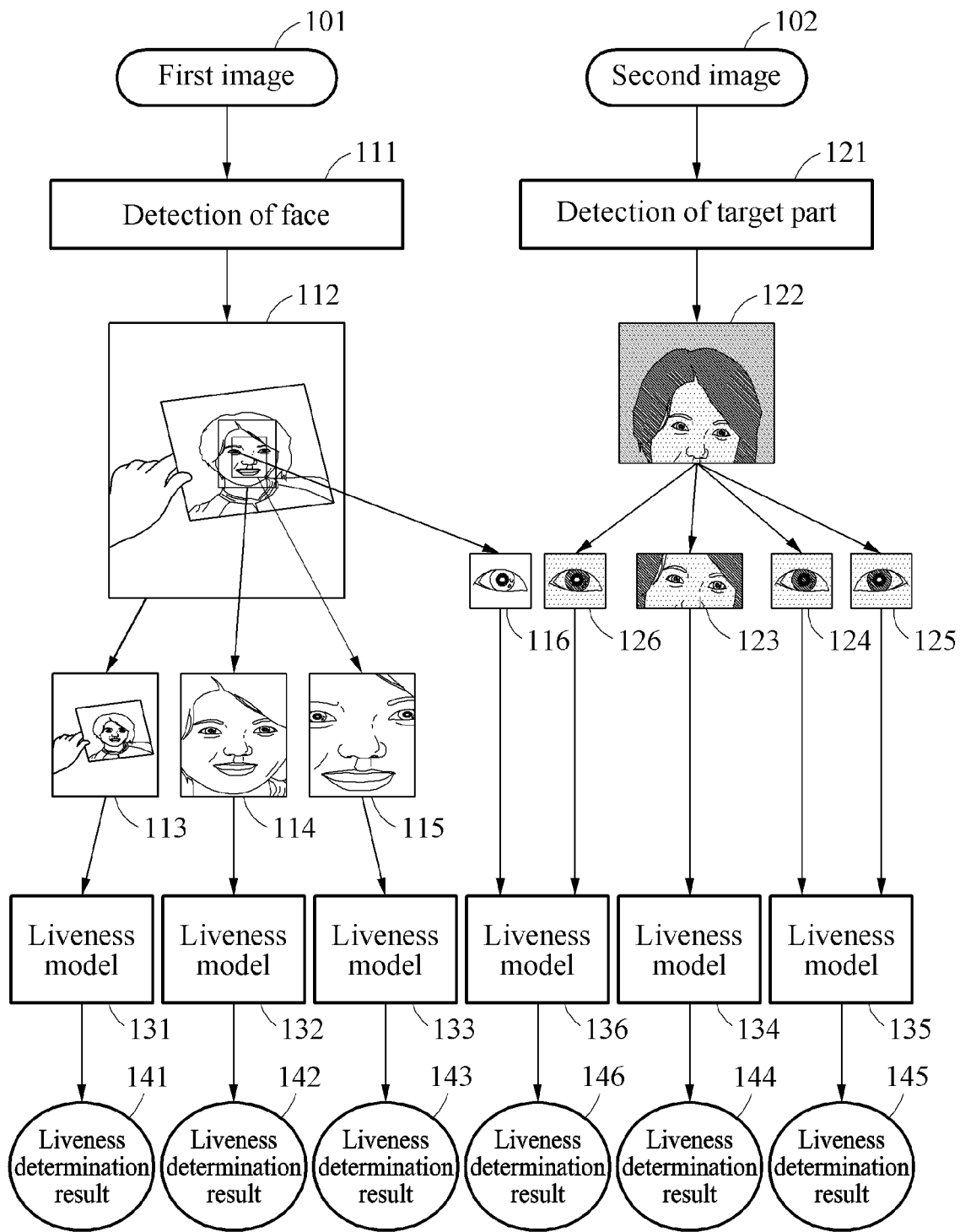
FIG. 1 illustrates an example of a liveness verification system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

FIG. 1 illustrates an example of a liveness verification system.

Herein, the term "recognition" may include verification and/or identification, for example. The verification may represent an operation of determining whether input data is true or false and the identification may represent an operation of determining a label corresponding to input data from among a plurality of labels. In an example, the verification and/or the identification may also be represented as or determined through respective probabilistic determinations, though examples are not limited thereto. Also, the use of the term 'may' herein with respect to an example or embodiment, e.g., as to what an example or embodiment may include or implement, means that at least one example or embodiment exists where such a feature is included or implemented while all examples and embodiments are not limited thereto.

A liveness verification relates to verifying whether an object to be verified is live, for example, verifying whether a face captured through a camera is a genuine face or a fake face, e.g., whether the captured face is or is more likely a live face or the captured face is or is more likely a spoofed face. The term "liveness" may be used as a term to distinguish an object having no life, for example, a photo, an image, and a 3D mask or physical model used as a fake or spoofing approach, and an object having life, for example, a living person. In one example, the liveness verification may be used to verify a liveness of an authentication target in association with a performed user authentication that is performed for or with a user login, a payment service, or an entrance control in various examples. The liveness verification may serve to prevent an erroneous authentication by filtering out an authentication attempt, for example, a spoofing attack, that attempts to use a substitute, for example, a photo, a mask, and a 3D mask or physical model of the user.

Figure 19:
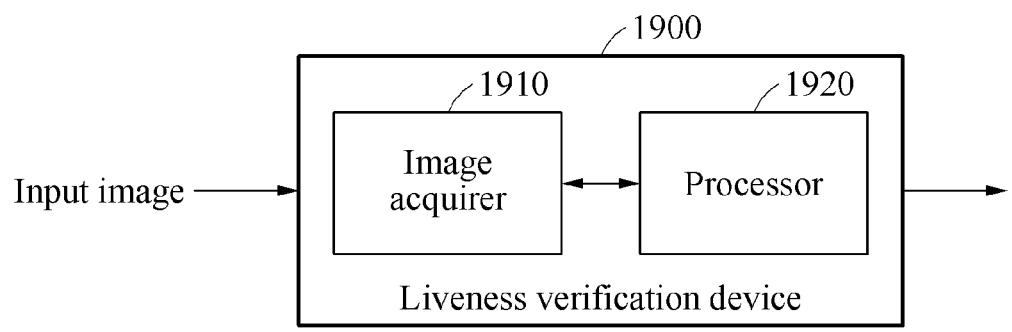
FIGS. 19 and 20 illustrate examples of a liveness verification apparatus.
Figure 20:
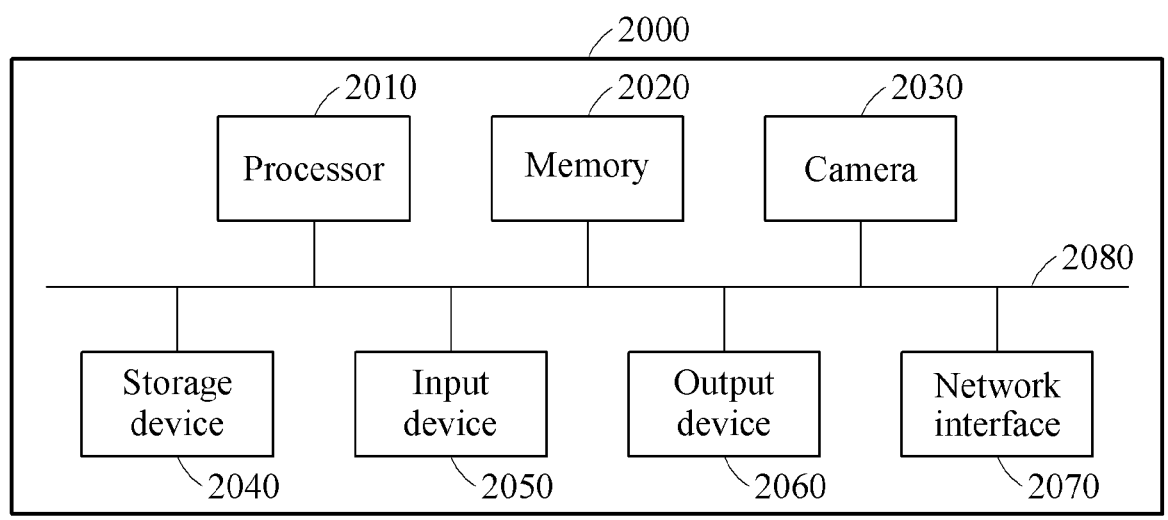

In examples, a liveness verification device (e.g., apparatus) may be representative of, or included in, a computing device or electronic device, such as represented in the liveness verification devices 1900 and 2000 of FIGS. 19 and 20. Such a computing or electronic device may be a smart-phone, a wearable device, a tablet computer, a netbook, a laptop, a desktop, a personal digital assistant (PDA), a set-top box, an electronic device, a biometric door lock, a security device, and/or a vehicle or vehicle starting device, as non-limiting examples.

During the above process, the liveness verification device verifies a liveness by collectively considering various factors of an image captured by one or more cameras or image sensors. For example, the liveness verification device may determine a liveness of a verification target based on context information or shape or spatial information of a face, e.g., an entire face, and texture information of a part of a face or a partial face included in the captured image. Clues may be available in an image that is captured at a distance from a verification target, and such clues may be used to determine whether the verification target is a projected face on the screen of an electronic device or paper. For example, beyond the reviewed face image, a hand of a user holding an electronic device or paper may be present, e.g., within the captured image or available from another captured image of the same or another image sensor, and if present this may represent a clue suggestive of the verification target being a fake or spoof attempt. Thus, such fake or spoof attempt situations may be effectively verified based on context information, e.g., environmental or other discernable aspects or context of the captured image, of or for the reviewed face image or verification target. Also, variances in the reflection of light, distortion of shapes, and the like, may be considered in the liveness verification based on the known or expected shape or spatial information of a face, e.g., of a user's previous live face or a general live face. For example, different distortions may be observed in the shape or spatial aspects of a face image due to respective differences in reflection of light between a genuine face of a person and a photo or paper that is one of various fake or spoofing approaches, reflecting bending or wrinkling of the photo or the paper. The liveness verification may be performed based on such factors. In addition, from extracted texture information, minute texture differences may be considered to distinguish between live skin of the person and fake or spoofed skin of a person shown in the paper or projected on the screen of the electronic device. As further explained below, liveness of the verification target may be further accurately determined by collectively considering various elements.

Referring to FIG. 1, the liveness verification device verifies a liveness of an object based on a first image 101 and a second image 102, for example. The first image and the second images may be respective captured images of an object or different images obtained from a same captured image.

For example, the liveness verification device may detect an object part that in the first image 101 or the second image 102. The liveness verification device may select respectively different images, image patches, and/or liveness models based on a determination of which type of detected part is represented by the detected object part.

For example, in operation 111, the liveness verification device detects a face in the first image 101. The first image 101 may have, for example, a first field of view (FOV) 112 or be a first FOV image. The liveness verification device selects one or more liveness models, from plural stored liveness models, corresponding to the face that is the detected object part. For example, in FIG. 1, the liveness verification device selects a first liveness model 131, a second liveness model 132, and a third liveness model 133 as liveness models corresponding to a facial part or face portions with plural facial features, e.g., eyes, nose, mouth, whole face, etc.

For example, the liveness verification device may extract respective patches of the first FOV 112 for each of the selected first liveness model 131, second liveness model 132, and third liveness model 133 from the first image 101. For example, the liveness verification device may extract an entire region patch 113, an object region patch 114, and a region of interest (ROI) patch 115 from the first image 101.

Herein, an entire region of an image may mean a region that represents the entire image or entire extents of the captured image, or region greater than an object region, from an image sensor or camera. The object region may mean a select region of a captured image that represents or is determined to represent or include an object. An ROI may mean be another select region that represents a particular or select feature(s) of the object, e.g., representing less than all features of the object. The object may be, for example, a face of a person. If the object is the face of the person, features of the object may include an eye, eyes, a nose, and lips of the face, as non-limiting examples and while also noting that additional or alternative distinguishing portions or aspects of the face or person may also be features of the face or person in alternative examples. Thus, with respect to FIG. 1, the entire region patch 113 may be an image patch corresponding to the entire image of the first image 101 or a patch with at least more context or face information than the object region 114, such a patch that may reflect context of the captured object, for example. Thus, the object region patch 114 may be an image patch that includes the object region in the first image 101, e.g., an image patch substantially or wholly filled with the entirety of the object or with a face area that includes all detected or captured features of the face, as a non-limiting example. Examples also exist with the object region patch 114 including most but less than all captured features, also as non-limiting examples. The ROI patch 115 may be an image patch that includes a ROI in the first image 101, e.g., without the entirety of the object region. In the example of FIG. 1, as a non-limiting example, the ROI patch 115 includes at least portions of each of both eyes, a nose, and lips, and more particularly another example of substantially most or all portions of each of both eyes, the nose, and the lips.

The liveness verification device may thus calculate a first liveness score based on any one or any combination of the entire region patch 113, the object region patch 114, and the ROI patch 115 of the first image 101, based on a first verification model. In the example of FIG. 1, for example, the first verification model may include any one or any combination of the first liveness model 131, the second liveness model 132, and the third liveness model 133, which are respectively provided the entire region patch 113, the object region patch 114, and the ROI patch 115. Here, the first verification model is not limited thereto and may represent various models that are trained based on such various patches corresponding to the first image 101. In addition, in an example where the first image 101 is a color image, the first verification model may implement one or more color liveness models, e.g., considering color or color influencing characteristics, and thus be a color verification model. Here, all liveness models of the first verification model may be such various color liveness models, only some may be color liveness models, or none may be color considering liveness models.

Accordingly, the liveness verification device inputs the entire region patch 113 to the first liveness model 131 that calculates a first liveness determination result 141, for example, as a corresponding liveness score. The liveness verification device inputs the object region patch 114 to the second liveness model 132 that calculates a second liveness determination result 142. The liveness verification device inputs the ROI patch 115 to the third liveness model 133 that calculates a third liveness determination result 143.

Also, the liveness verification device may calculate the first liveness score through an ensemble consideration of the first, second, and third liveness determination results 141, 142, and 143. The first liveness score may thus represent a liveness score that is calculated based on the first image 101. In an example where the first image 101 is a color image, the first liveness score may also be referred to as a color liveness score. Herein, the liveness score may refer to a score or probability that is calculated to verify the liveness of the object.

In operation 121, the liveness verification device detects a target part, for example, an eye part or portion, of an object in the second image 102. For example, the object may be detected in the second image 102, and respective parts or portions of the second image 102 detected or determined. The object in the second image 102 may thus be the same object as in the first image 101. Here, the second image 102 may have a second FOV 122, e.g., a FOV less than the first FOV 112, noting that alternative examples are also available. For example, the second FOV 122 of the second image 102 may have the same FOV as the first FOV 112. The liveness verification device may also select respective liveness models, from plural available liveness models, corresponding to each of the detected target part, e.g., of respective select detected target parts. For example, in FIG. 1, the liveness verification device may select a fourth liveness model 134 and a fifth liveness model 135 as liveness models respectively corresponding to two select target part(s). In an example, the fourth liveness model 134 and a fifth liveness model 135 may also be liveness models corresponding a same target part.

For example, the liveness verification device may extract respective patches to be used for each of the selected fourth liveness model 134 and fifth liveness model 135 from the second image 102. For example, the liveness verification device may extract an object region patch 123, a first target region patch 124, and a second target region patch 125 from the second image 102.

Herein, the term "target region" may mean a region that represents a target part or portion of an object. The target part or portion may mean a part or portion of the object that is designated to verify the liveness of the object. For example, if the object is a face of a person, a target part may be designated, e.g., predesignated during manufacturing, through subsequent installation or updates, or prior to verification, or designated during verification, to be an eye of the person. A first target part may mean one of a left eye and a right eye, with a second target part being the other eye that is not the first target part. The target region patch may mean an image patch that includes the target region, e.g., focusing on or predominantly only including select parts, in an image. For example, the first target region patch 124 may be an image patch that includes, for example, a left-eye region and the second target region patch 125 may be an image patch that includes, for example, a right-eye region.

The liveness verification device may thus calculate a second liveness score based on any one or any combination of the object region patch 123, the first target region patch 124, and the second target region patch 125 of the second image 102 based on a second verification model. In the example of FIG. 1, for example, the second verification model may include any one or any combination of the fourth liveness model 134, which is provided the object patch 123, and the fifth liveness model 135, which is provided the first target region patch 124 and the second target region patch 125. Here, the second verification model is not limited thereto and may represent various models that are trained based on various patches corresponding to the second image 102. In addition, as a non-limiting example, in an example where the second image 102 is an IR image, the second verification model may implement one or more IR liveness models, e.g., considering IR or IR influencing characteristics, and thus be an IR verification model. Here, all liveness models of the second verification model may be such various IR liveness models, only one may be IR liveness models, or none may be IR considering liveness models.

Accordingly, the liveness verification device may calculate a fourth liveness determination result 144, for example, a liveness score, by inputting the object region patch 123 of the second image 102 to the fourth liveness model 134. The liveness verification device may further calculate a fifth liveness determination result 145 by inputting the first target region patch 124 and the second target region patch 125 to the fifth liveness model 135. Also, the liveness verification device may calculate the second liveness score through an ensemble consideration of the fourth and fifth liveness determination results 144 and 145. The second liveness score may thus represent the liveness score that is calculated based on the second image 102. In an example where the second image 102 is an IR image, the second liveness score may also be referred as an IR liveness score.

In addition, in an example, when a same target part, for example, an eye or either eye, is detected in the first image 101 and the second image 102, the liveness verification device may select a sixth liveness model 136 trained to calculate a liveness score of such target parts from such an image 101 and second image 102. The liveness verification device may extract a first image patch 116, for example, a color patch, corresponding to the target part, for example, the eye, from the first image 101 and extract a second image patch 126, for example, an IR patch, from the corresponding target part, for example, the same eye, from the second image 102. The liveness verification device calculates a sixth liveness determination result 146 by inputting the first image patch 116 corresponding to the target part and the second image patch 126 corresponding to the target part to the sixth liveness model 136. The liveness verification device may thus calculate a third liveness score as the sixth liveness determination result 146.

In one example, the liveness verification device may calculate a final liveness score using one of the first through sixth liveness determination results 141 through 146 or through an ensemble consideration of any one or any combination of the first through sixth liveness determination results 141 through 146. Herein, references to 'any combination' means that the referred to any combination includes all variant examples of any two or more in any and all combinations and any and all varied sequencing. For example, the liveness verification device may verify the liveness of the object based on any one or any combination of the first liveness score that is calculated based on the first verification model and the second liveness score that is calculated based on the second verification model, or based on any one or any combination of the first liveness score, the second liveness score, and the third liveness score that is calculated based on the sixth liveness model 136. The liveness verification device may verify the liveness of the object present within the first image 101 and the second image 102, based on the final liveness score.

As described above, the liveness verification device verifies the liveness of the object from various image patches of the first image 101 and the second image 102 based on the first through sixth liveness models 131 through 136. For example, each of the first through sixth liveness models 131 through 136 may represent respective models that provide, and are trained to provide, respective information, for example, corresponding probability values, labels, or feature values, used to determine the liveness of the object based on respective various input information to each of the first through sixth liveness models 131 through 136. Accordingly, each of the first through sixth liveness models 131 through 136 may thus be pre-trained based on respective training data according to respective supervised learning schemes. The liveness models may also be trained independently or in various combinations. Through the respective trainings, each of the first through sixth liveness models 131 through 136 may perform non-linear mappings and may provide distinguishing capabilities in terms of liveness verification. As non-limiting examples, each of the first through sixth liveness models 131 through 136 may be neural network liveness models. In other examples, each of the first through sixth liveness models 131 through 136 may include a model in various machine learning structures, such as a support vector machine (SVM). In further example, some of the first through sixth liveness models 131 through 136 may be neural network based liveness models while other liveness models of the first through sixth liveness models 131 through 136 are such other various machine learning structures. Also, while such neural network liveness models or SVM liveness models are described here, these descriptions are non-limiting examples, as alternative examples exist with the liveness models having alternative structures.

Thus, as a non-limiting example, each of the first through sixth liveness models 131 through 136 may include or be a deep convolutional neural network (DCNN) model. The respective DCNN models may include one or more convolution layers, pooling layers, and/or fully connected layers, and may provide information for determining a liveness from image information that is input to each of the first through sixth liveness models 131 through 136 through an operation process performed in each hidden layer. Here, in an example, input image information to respective input layers to each of the first through sixth liveness models 131 through 136 may be or include pixel values, for example, color values and/or brightness or intensity values, of each of the pixels included in the respective input image or image patch information. The DCNN models are provided as examples only. For example, as noted above, each of the first through sixth liveness models 131 through 136 may be based on various structures of other machine learning structures in addition or as an alternative to the DCNN model.

Although a description is made herein based on an example in which the first image 101 is a color image and the second image 102 is an IR image, it is provided as a non-limiting example only. The first image 101 and the second image 102 may be heterogeneous or different type images. For example, each of the first image 101 and the second image 102 may both be one of a color image, a black-and-white image, and a depth image. For example, the first image 101 may be one of the color image, the black-and-white image, and the depth image, and the second image 102 may be one of remaining images types, different from the first image 101, e.g., when the first image 101 is a color image the second image 102 may be a black-and-white image or a depth image, or when the first image 101 is a black-and-white image the second image 102 may be a color image or a depth image. The depth image may refer to an image captured through a depth sensor, for example. Each pixel of the depth image may have a value indicating a distance from a corresponding point. The depth sensor may be, for example, a sensor based on a time-of-flight (ToF) scheme, a sensor based on a structured light scheme, and the like. The depth image may alternatively be generated based on analyses of a captured image by an image sensor or analyses of separate captured images from a same or respectively separated image sensors.

In addition, in an example, a color image and an IR image may also or alternatively be acquired using separate image sensors. For example, if a user desires to photograph a face or an iris for user authentication, a color image for the user authentication is acquired through a color image sensor and an IR image for the user authentication is acquired through an IR image sensor. The IR image may be acquired in such a manner that IR rays irradiated from an IR light source are reflected from the user and the reflected IR rays are sensed at the IR image sensor. In one example, the color image sensor may include an IR cutoff filter configured to cut off IR rays incident to the color image sensor and a color pixel array configured to sense a color value of red (R), green (G), and blue (B). The IR image sensor may include an IR pass filter configured to allow IR rays incident to the IR images sensor to pass and an IR pixel array configured to sense an IR value. Alternative IR sensor approaches are also available.

In response to a request for verifying a liveness of the user or to perform authentication, the liveness verification device may receive the color image and the IR image from the color image sensor and the IR image sensor, respectively, and may perform a liveness verification operation based on the received color image and IR image.

Also, in an example, the color image and the IR image may be acquired through a single image sensor. For example, when the color image and the IR image of the verification target are required or selectively required for liveness verification, the liveness verification device may activate an IR light source and receive image information sensed by an integrated image sensor. In an example, the integrated image sensor may include an optical filter including an IR cutoff region configured to cut off IR rays incident to the integrated image sensor and an IR pass region configured to allow a corresponding IR ray to pass and a pixel array configured to sense an IR value. Although the pixel array is partially illustrated, the integrated image sensor may include a pixel array in which a pixel structure included in the pixel array is repeatedly disposed.

Accordingly, the integrated image sensor may measure a color value and an IR value using the same pixel array. The pixel array may include a first light receiving element configured to measure an R color value, a second light receiving element configured to measure a G color value, a third light receiving element configured to measure a B color value, and a fourth light receiving element configured to measure an IR value. The liveness verification device may separate the color value and the IR value measured by the integrated image sensor from each other and may respectively generate a color image and an IR image based on a result of the separation. The liveness verification device may perform a liveness verification operation based on the generated color image and IR image.

Figure 2:
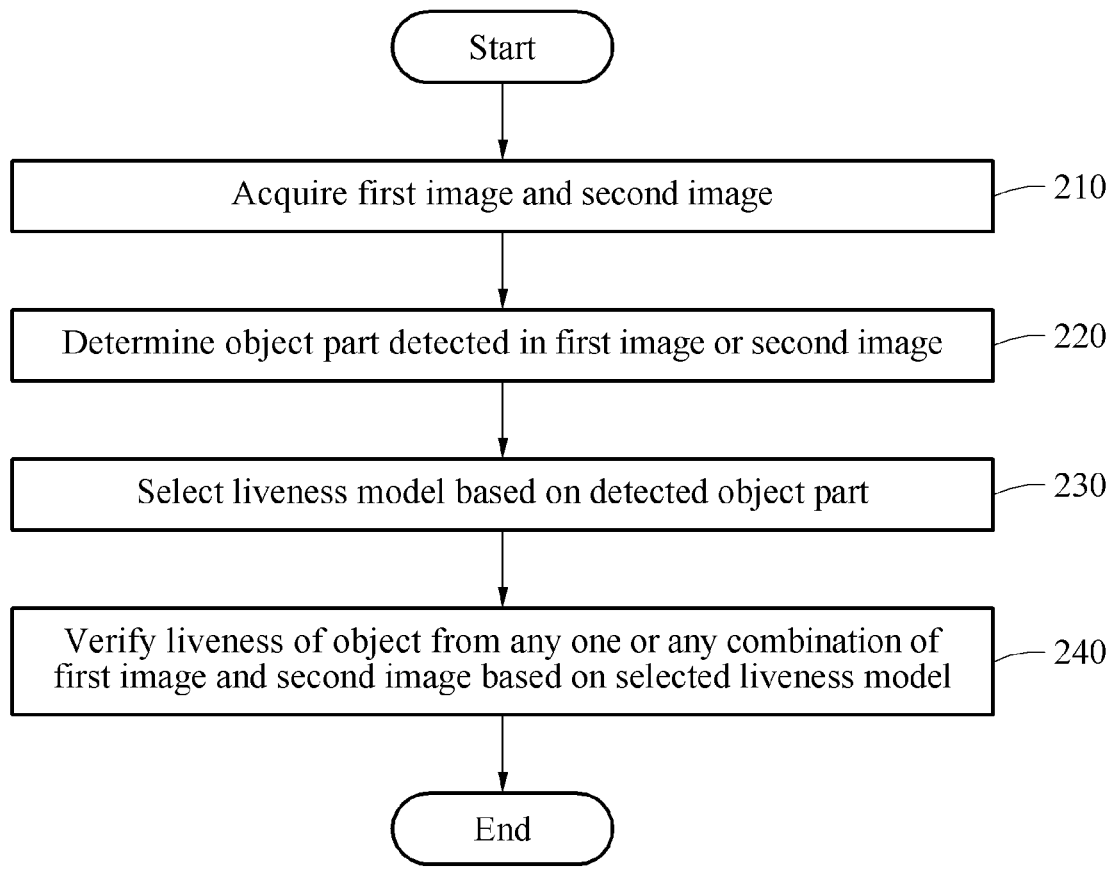
FIGS. 2 through 4 are flowcharts illustrating examples of a liveness verification method.

FIG. 2 is a flowchart illustrating an example of a liveness verification method.

Referring to FIG. 2, in operation 210, a liveness verification device acquires a first image and a second image, such as the first image and the second image of FIG. 1, though examples are not limited thereto. For example, the liveness verification device may acquire the first image, for example, a color image through a first image sensor, for example, a color image sensor, and may acquire the second image, for example, an IR image, through a second image sensor, for example, an IR image sensor. Here, it is provided as an example only and thus, the liveness verification device may also acquire all of the first image and the second image through an integrated image sensor. In an example, the liveness verification device is an electronic or computing device that includes the first image sensor and the second image sensor, such as the liveness verification apparatuses 1900 and 2000 of FIGS. 19 and 20.

In operation 220, the liveness verification device determines an object part detected in the first image and/or the second image. For example, the liveness verification device may identify an object part detected in the first image and an object part detected in the second image. For example, the liveness verification device may determine whether a facial part, as an example object part, is detected in the first image and/or whether an eye part, as a further example object part, is detected in the second image.

In operation 230, the liveness verification device may select a liveness model based on the object part(s) that are detected in the first image and/or the second image. The liveness verification device may also select the liveness model(s) based on which of plural predetermined object parts are respectively detected in the first image and/or the second image. For example, in response to such a detecting for and/or determination of a target part, e.g., an eye, in the first image and/or the second image, the liveness verification device may select any one or any combination of a plurality of liveness models, e.g., any one or any combination of liveness models for the target part. As a non-limiting example, the target part may correspond to a particular object part having particular liveness detectable characteristics, such as a single eye, both eyes, or a particular one of the left and right eyes, and such as based on spatial, spectral, or texture characteristics particular to such a particular object part. Hereinafter, an example of selecting a liveness model based on the detected object when the first image is a color image and the second image is an IR image will be described, noting that the respective types of the first image and the second image (e.g., color or IR image types) are not limited thereto.

For example, among the liveness models, a color verification model may represent a model that is trained to calculate a color liveness score from an image patch extracted from the color image. An IR verification model may represent a model that is trained to calculate an IR liveness score from an image patch extracted from the IR image. For example, each of the color verification model and the IR verification model may be neural network based verification models and respectively configured so that, upon reading from a memory of their corresponding trained parameters by one or more processors, the one or more processors may implement the respective verification models for an input image patch to calculate, determine, or corresponding extract liveness scores specific to the trained objective, e.g., the color liveness score or the IR liveness score, of the respective verification model.

For example, in response to a detecting for and/or determination that the target part is located in a desired region of the color image, the liveness verification device selects a part comparison model. In an example, the liveness verification device may select respective part comparison models respectively based on which of plural predetermined target parts are respectively detected in the color image. For example, referring to the non-limiting example of FIG. 1, a part comparison model particular to a same eye in the object, as the target part, in both the color image and the IR image may be selected and implemented. Also, in an example, the desired region may be a region corresponding to a field of view (FOV) of the corresponding sensor that was used to capture the color image and/or in the case of a desired region of the IR image the FOV of the corresponding sensor that was used to captured the IR image. The example part comparison models may represent models that are trained to calculate respective liveness scores from a corresponding color patch extracted in correspondence to the corresponding target part from a color image and a corresponding IR patch extracted in correspondence to the correspondingly detected target part in an IR image. As a non-limiting example, the part comparison models may be neural network based part comparison models and respectively configured so that, upon reading from the memory of their corresponding trained parameters by the one or more processors, the one or more processors may implement the respective part comparison models for the input color patch and IR patch to calculate, determine, or corresponding extract liveness scores specific to the trained objective, e.g., the part comparison liveness score, of the respective comparison model. In such a neural network based comparison model, the corresponding neural network may include plural input layers, for example, with the color patch being input to one of the input layers and the IR patch being input to another of the input layers.

In response to a detecting for and/or determination that the target part is located outside the example desired region of the color image and at least a portion of the object is located in the desired region, the liveness verification device may select an IR region model. The IR region model may represent a model that is trained to calculate an IR liveness score from an image patch corresponding to remaining part(s) of the face, for example, the nose, lips, and skin, excluding the target part or excluding a detected or determined target part. For example, the IR region model may perform or include, for deriving a corresponding liveness score, cross-correction coefficient analyses, linear classifier(s) configured to perform classification based on a linear combination of given properties, consideration of a determined interaction rate between feature points, or a deviation determination, as non-limiting examples. The IR region model may be a model in various machine learning structures, for example, an SVM, noting that examples are not limited thereto. As a non-limiting example, the IR region model may be configured so that, upon reading from the memory of its corresponding trained parameters or other stored characteristics by the one or more processors, the one or more processors may implement the IR region model for the image patch corresponding to the remaining part(s) of the face to calculate, determine, or corresponding extract the corresponding liveness score specific to the trained objective, e.g., the corresponding liveness score with respect to such an image patch corresponding to remaining part(s) of the face.

Also, in response to a detecting of a pupil of the object in the IR image, for example, the second image in the above example of FIG. 1, the liveness verification device may select a pupil model. The pupil model may represent a model that is trained to calculate an IR liveness score (or pupil score) from a pupil patch corresponding to a pupil in the IR image. As a non-limiting example, the pupil model may be neural network based pupil model and configured so that, upon reading from the memory of its corresponding trained parameters by the one or more processors, the one or more processors may implement the pupil model for the input pupil patch to calculate, determine, or corresponding extract the corresponding IR liveness score specific to the trained objective, e.g., the IR liveness score with respect to an input pupil patch.

Here, the respective liveness models are not limited to the various example color verification model, IR verification model, part comparison model, IR region model, and pupil model. Rather, in various examples various liveness determining models using the entire region patch and/or a partial patch of one or more color images and one or more IR images may be used to calculate the respective liveness scores, and from which a final liveness score may be determined, for example.

Thus, in operation 240, the liveness verification device verifies a liveness of the object from any one or any combination of the first image and the second image based on the selected liveness model(s).

For example, the liveness verification device may calculate the liveness score from any one or any combination of a first image patch corresponding to the object part present within the first image and a second image patch corresponding to the object part present within the second image based on the liveness model selected in operation 210. If this liveness score is determined to meet, e.g., is greater than or equal to, a liveness threshold, the liveness verification device may determine that an image of a real object has been acquired. However, if this liveness score is determined to not meet, e.g., is less than, the liveness threshold, the liveness verification device may determine that an image of a fake object has been acquired. Herein, liveness thresholds denote respective thresholds that may be used as standards to determine whether the object is a real object (or fake object) or suggestive of a real object (or fake object). Further herein, although descriptions may be made below based on respective examples in which a liveness score (or respective liveness scores suggesting real objects) of a real object is determined to meet respective example liveness threshold(s) when the respective liveness scores are greater than or equal to the respective liveness thresholds, and the liveness score (or the respective liveness scores are suggesting of fake objects) of a fake object is determined to not meet the example liveness threshold(s) when the respective liveness scores are less than the respective liveness thresholds, this is only an example, and thus, respective inverse cases are also available in other examples. For example, a liveness score of a real object (or suggestive of a real object) may be designed to meet a corresponding threshold, and thus be a real object or suggestive of the real object, when the liveness score is less than the corresponding liveness threshold, and the liveness score of the fake object (or suggestive of a fake object) may be designed to not meet the corresponding threshold, and thus be a fake object or suggestive of the fake object, when the liveness score is be greater than or equal to the corresponding liveness threshold.

Figure 3:
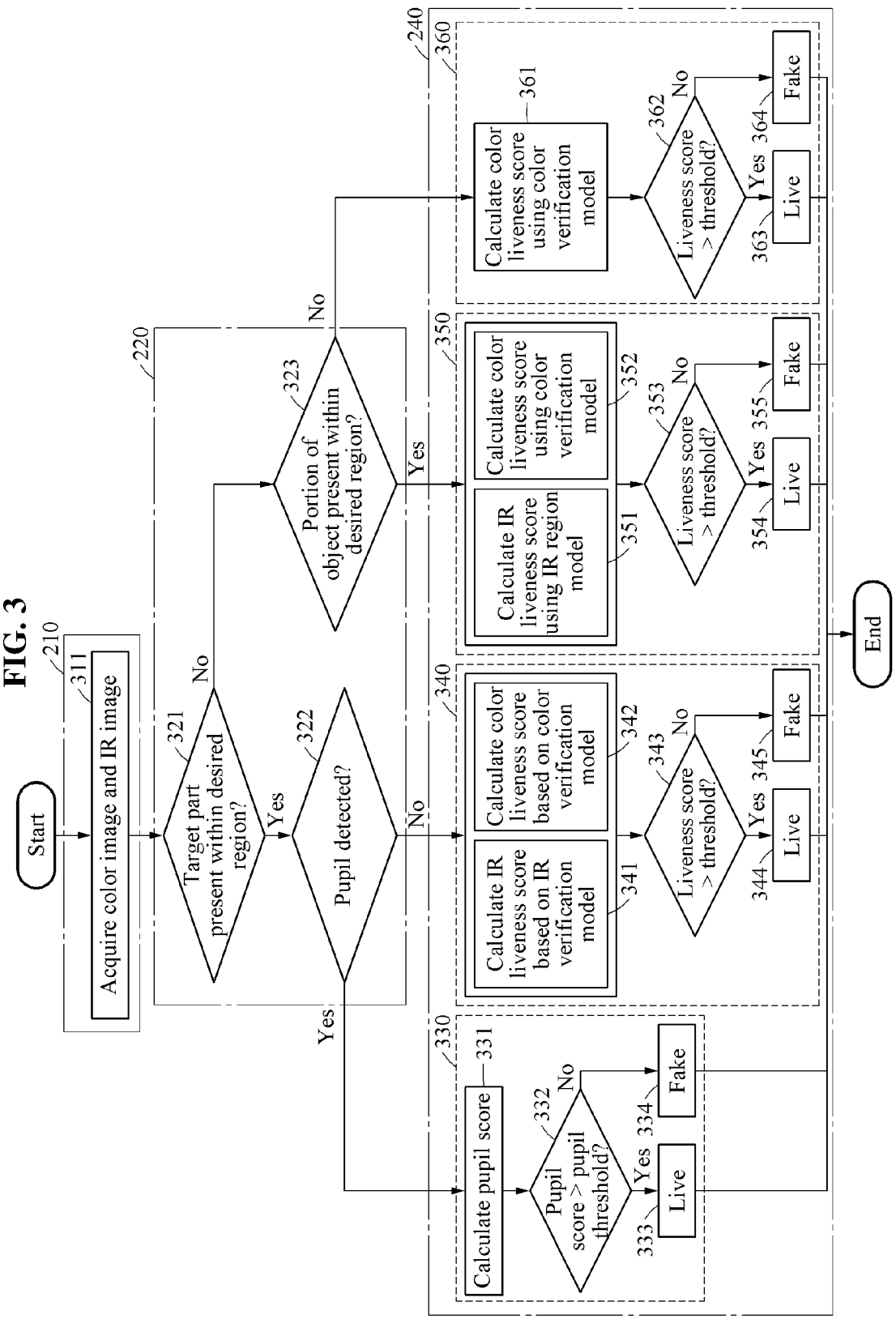

FIG. 3 is a flowchart illustrating an example of a liveness verification method.

FIG. 3 illustrates an example of the liveness verification method in which a first image is a color image and a second image is an IR image, such as the first image and second image of FIG. 1 and/or FIG. 2, noting that examples are not limited thereto. Here, in the liveness verification method, though the color and IR image types are discussed the types of image are not limited thereto. Below, for explanatory purposes, explanations of FIG. 3 will be made with reference to operations of FIG. 2, while noting that other examples are not limited thereto.

In operation 210, the liveness verification device may acquire the first image and the second image. In operation 311, the liveness verification device may acquire or respectively acquire, for example, the color image and the IR image. For example, an image acquirer of the liveness verification device may acquire the color image and the IR image by capturing an image of an object. In another example, respective image acquirers respectively acquire the color image and the IR image.

In operation 220, the liveness verification device determines an object part detected in the first image or the second image. In operation 321, the liveness verification device determines whether a target part of the object is present within a desired region of the color image. For example, the liveness verification device may determine whether an eye is present within the desired region of the color image.

In operation 322, when the target part is determined to be present within the desired region of the color image, the liveness verification device determines whether a pupil is detected in the IR image. When the pupil is determined to be detected in the IR image, the liveness verification device selects a pupil model as a liveness model. On the contrary, if the pupil is determined to not be detected in the IR image, the liveness verification device selects a color verification model, for example, a first verification model, and an IR verification model, for example, a second verification model.

In operation 323, when the target part of the object is determined to be absent within the desired region of the color image, the liveness verification device determines whether at least a portion of the object is present within the desired region. When the portion of the object is determined to be present within the desired region, the liveness verification device selects an IR region model as the liveness model with the color verification model. Accordingly, although the target part may be determined to not be located in the IR image, the liveness verification device may use the IR region model to calculate the liveness score based on a remaining part, for example, the skin, of the object. When the portion of the object is determined to be absent within the desired region, the liveness verification device may select the color verification model as the liveness model.

Here, the desired region of the color image of operation 321 may be a region corresponding to a field of view (FOV) of a corresponding IR sensor that was used to capture the IR image. If the target part, for example, an eye, is absent within the desired region, the target part is determined to be absent in the IR image. Accordingly, the liveness verification device may skip the pupil detection for the current acquired color and IR images.

In one example, the liveness verification device may determine the target part by performing a process corresponding to operations 321, 322, and 323 and may select the liveness model based on the determined target part. Here, although FIG. 3 illustrates that all of operations 321, 322, and 323 are performed, it is provided as an example only. For example, the liveness verification device may select the liveness model based on the target part of the object that is detected in the color image. When the target part of the object is detected in the color image, the liveness verification device may select the color verification model among the liveness models. As another example, the liveness verification device may also select the liveness model based on the target part of the object that is detected in the IR image.

In operation 240, the liveness verification device performs a liveness verification based on the liveness model that is selected based on the object part detected in operation 220.

For example, in operation 330, the liveness verification device verifies the liveness of the object from a pupil patch corresponding to the pupil based on the pupil model. In operation 331, the liveness verification device calculates a pupil score from the pupil patch based on the pupil model. In operation 332, the liveness verification device determines whether the pupil score is greater than a pupil threshold. When the pupil score meets, e.g., is greater than, the pupil threshold, the liveness verification device determines that the object has the liveness, that is, is live in operation 333 and not a fake image. On the contrary, when the pupil score fails to meet, e.g., is less than or equal to, the pupil threshold, the liveness verification device determines that the captured object is a fake object. The pupil threshold denotes a threshold used to determine whether the object is real.

When the pupil is detected in the IR image, the liveness verification device may accurately and quickly verify the liveness of the object using the pupil score that is calculated based on the IR image and the pupil model. In an example, when the pupil score meets the pupil threshold, the verification operation may cease and be complete, e.g., without having to implement further liveness score calculating models for other aspects of the color and/or IR images.

As another example, in operation 340, the liveness verification device may alternatively or additionally verify the liveness of the object based on the color verification model and the IR verification model. In this case, the liveness verification device may perform a composite verification based on a color patch and an IR patch of the target part, for example, an eye, using the color verification model and the IR verification model.

In operation 341, the liveness verification device calculates an IR liveness score from the IR patch corresponding to the target part in the IR image, based on the IR verification model. The liveness verification device may verify the liveness of the object based on the color liveness score and the IR liveness score.

In operation 342, the liveness verification device calculates a color liveness score from a color patch corresponding to the target part in the color image, based on the color verification model.

In operation 343, the liveness verification device calculates a final liveness score through ensemble of the color liveness score and the IR liveness score and determines whether the final liveness score is greater than the liveness threshold. As a non-limiting example, the liveness verification device may perform ensemble of the color liveness score and the IR liveness score by calculating a weighted sum of the color liveness score and the IR liveness score as the final liveness score. The liveness verification device may also determine a maximum value or a minimum value of the color liveness score and the IR liveness score as the final liveness score.

Also, when the color liveness score or the IR liveness score is determined to be outside a preset range, for example, if the liveness score is determined to be significantly high or significantly low, e.g., based on respective high and/or low thresholds, the liveness verification device may skip operation 341 or 342. For example, when the IR liveness score is determined to be outside the preset range, the liveness verification device may skip operation 342. For example, operations 341 and 342 may be performed in alternate sequences, such that the IR liveness score is determined before determining whether the perform operation 342, or such that the color liveness score is determined before determining whether the perform operation 341. In such an example where operation 342 is skipped, the liveness verification device may exclude the color liveness score determination and may determine the final liveness based on the IR liveness score, while in such an example where operation 341 is skipped, the liveness verification device may exclude the IR liveness score determination and may determine the final liveness based on the color liveness score. As a further example, when one of the determined color or IR liveness scores are determined to be significantly low, then the significantly low liveness score may be excluded from consideration for the final liveness, or when one of the determined color or IR liveness scores are determined to be significantly high, then the significantly high liveness score may be the only liveness score considered in this final liveness determination.

In operation 344, when the final liveness score is determined to meet, e.g. greater than, the liveness threshold, the liveness verification device determines that the object is a real object, that is, live and not a fake object. If the final liveness score is determined to not meet, e.g., less than or equal to, the liveness threshold, the liveness verification device determines that the object is a fake object in operation 345.

As another example, in operation 350, the liveness verification device may additionally or alternatively verify the liveness of the object based on the color verification model and the IR region model. In this case, although the target part is determined to be absent in the IR image, the liveness verification device may perform a composite verification based on an IR patch corresponding to a remaining part and a color patch corresponding to the target part.

For example, in operation 351, the liveness verification device calculates an IR liveness score from an IR patch corresponding to the remaining part excluding (e.g., because the target part is absent or missing or not detected/determined) the target part using the IR region model, and in operation 352, the liveness verification device calculates the color liveness score from the color patch corresponding to the target part using the color verification model.

In operation 353, the liveness verification device calculates a final liveness score from the IR liveness score calculated in operation 351 and the color liveness score calculated in operation 352 and determines whether the final liveness score meets, e.g., is greater than or equal to, the liveness threshold.

In operation 354, when the final liveness score is determined to meet, is greater than, the liveness threshold, the liveness verification device determines that the object is a real object, that is, live and not a fake object. When the final liveness score is determined to not meet, e.g., is less than or equal to, the liveness threshold, the liveness verification device determines that the object is a fake object in operation 355.

As another example, in operation 360, when the IR image is determined to be invalid, the liveness verification device may verify the liveness of the object using the color liveness score based on the color verification model without calculating or relying on the IR liveness score. The invalid IR image refers to an IR image in a state in which the target part and the remaining part of the object are determined both absent or quality of the IR image is determined low, through various quality determination approaches.

In operation 361, the liveness verification device calculates the color liveness score using the color verification model. In operation 362, the liveness verification device determines whether the color liveness score meets, e.g., is greater than, the liveness threshold. When the color liveness score meets the liveness threshold, the liveness verification device determines that the object is a real object, that is, live and not a fake object, in operation 363. When the color liveness score fails to meet, e.g., is less than or equal to, the liveness threshold, the liveness verification device determines that the object is a fake object in operation 364.

Although FIG. 3 is described with respect to the liveness verification device comparing the respective liveness scores to a corresponding single liveness threshold, such an example is only provided for explanatory purposes. For example, when a determined liveness score is determined to be within a predetermined valid range, for example, a first valid threshold<liveness score<second valid threshold, the liveness verification device may determine that the object is a real object having the liveness. As another example, when the liveness score is less than or equal to a third valid threshold, the liveness verification device may determine that the object is a real object having the liveness. Accordingly, examples with various thresholds are available and examples are not limited to the above examples of FIG. 3.

Figure 4:
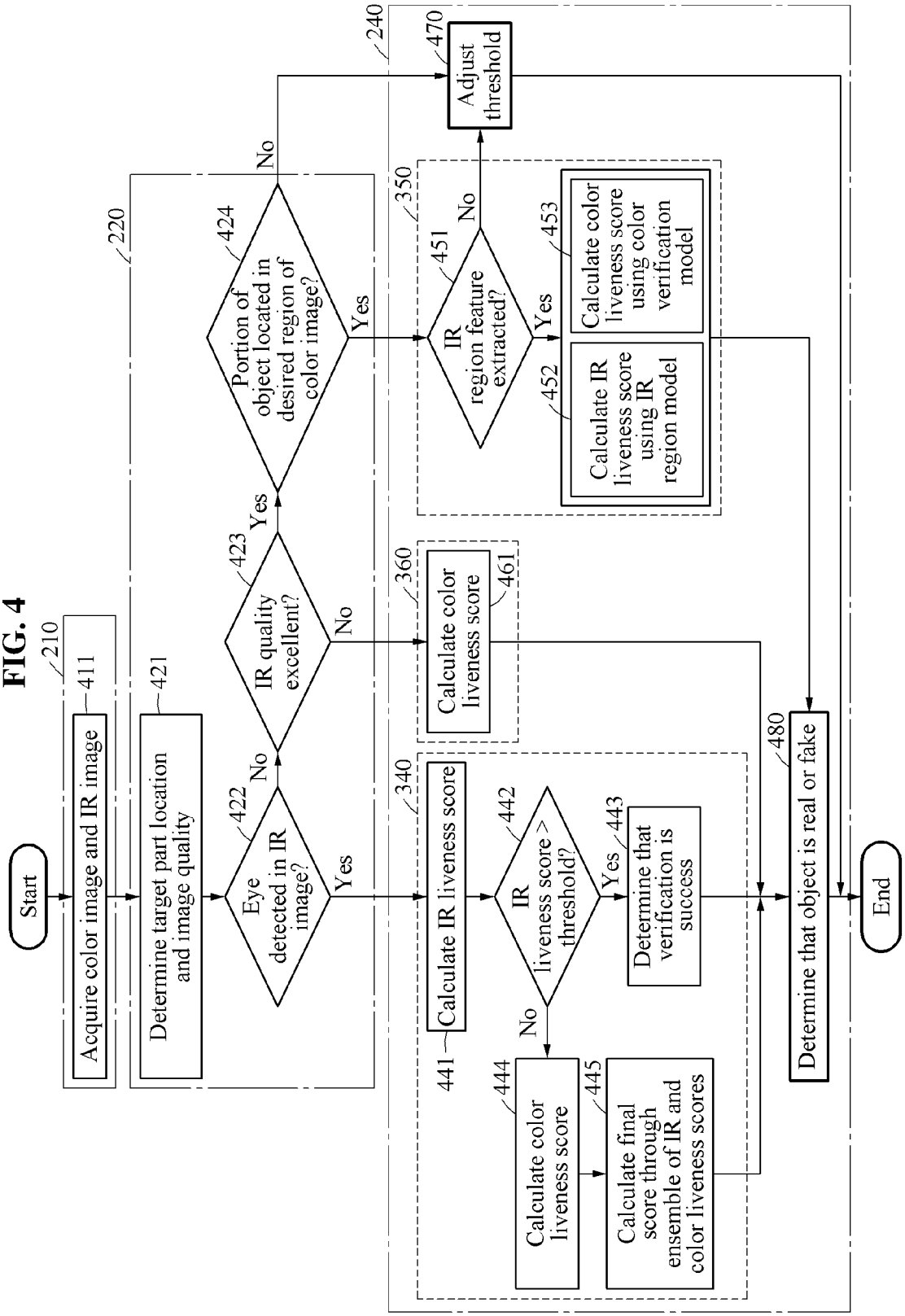

FIG. 4 is a flowchart illustrating another example of a liveness verification method.

For example, although the liveness verification method of FIG. 3 may calculate a liveness score selectively of respectively using, or having the availability of variously using, all of the example IR verification model and color verification model of FIG. 3, the liveness verification method may not include or may skip the implementation operation of some of the liveness models discussed with respect to FIG. 3. For example, when results of one of the IR verification model and the color verification model has a determined significantly high or determined significantly low liveness score, the liveness verification device may enhance an operation rate of the liveness verification by excluding an operation of a select liveness model described in FIG. 3 through the liveness verification method of FIG. 4. Such significantly high or significantly low liveness scores may be determined based on respective high and low liveness thresholds, for example. As only an example, the liveness verification method of FIG. 4 may omit or selectively omit the pupil score calculation of FIG. 3. In addition, for explanatory purposes, explanations of FIG. 4 will be made with reference to operations of FIGS. 2 and 3, while noting that other examples are not limited thereto.

Referring to FIG. 4, in operation 411, the liveness verification device acquires a color image and an IR image, such as described above with respect to FIG. 3.

In operation 421, the liveness verification device determines a target part location and an image quality. For example, the liveness verification device may determine a location of a target part of an object in the color image. The liveness verification device may determine the image quality of the IR image. Here, in alternate examples operation 421 may be skipped or omitted.

In operation 422, the liveness verification device determines whether an eye is detected in the IR image. For example, the liveness verification device may determine whether the target part of the object is located in a desired region of the color image.

For example, when the eye is detected in the IR image, the liveness verification device may select the IR verification model. Here, the IR verification model may be same as discussed above with respect to FIG. 2 or 3, though examples are not limited thereto. In operation 441, the liveness verification device calculates an IR liveness score based on the IR verification model. In operation 442, the liveness verification device determines whether the IR liveness score is meets, e.g., greater than, a liveness threshold. When the IR liveness score is determined to meet the liveness threshold, the liveness verification device determines that the verification is a success in operation 443. In an example, when the IR liveness score is determined to be high, e.g., based on a high threshold, the liveness verification device may exclude the color image and may quickly determine that the verification is a success. The exclusion of the color image may include not performing a liveness determination with respect to the color image, or not further relying on a liveness score from such a liveness determination with respect to the color image.

In operation 444, the liveness verification device selects the color verification model and calculates a color liveness score based on the color verification model. Here, the color verification model may be same as discussed above with respect to FIG. 2 or 3, though examples are not limited thereto.

In operation 445, the liveness verification device calculates a final liveness score through ensemble of the IR liveness score and the color liveness score, such as through a weighted sum of the IR liveness score and the color liveness score. In operation 480, the liveness verification device determines whether the object is a real object or a fake object based on whether the final liveness score meets, e.g., is greater than, the liveness threshold.

In operation 423, when the eye is not detected in the IR image, the liveness verification device determines whether IR quality of the IR image is of sufficiently high quality, e.g., a quantitative excellent quality. For example, the liveness verification device may determine whether the IR quality meets, e.g., is greater than, a quality threshold. When the IR image meets the quality threshold then the IR image may be determined to be valid, and when the IR image does not meet the quality threshold then the IR image may be determined to be invalid.

In operation 461, when the IR quality is determined to be invalid, the liveness verification device may calculate the liveness score from the calculated color liveness score based on the color verification model. Accordingly, if the IR image is determined to be invalid due to low IR quality of the IR image, the liveness verification device may calculate the liveness score based on only the color image. In operation 480, the liveness verification device determines whether the object is a real object or a fake object based on whether the liveness score is greater than the liveness threshold.

In operation 424, when the IR image is determined valid, the liveness verification device determines whether a portion of the object is located in a desired region of the color image. For example, in response to detecting at least a portion of the object in the desired region of the color image, the liveness verification device may determine that at least a portion of the object is located in the IR image.

In operation 451, when at least a portion of the object is determined to be located in the desired region, the liveness verification device extracts an IR region feature. The IR region feature may represent a feature that is extracted from the IR image based on the IR region model. Here, the IR region model may be same as discussed above with respect to FIG. 2 or 3, though examples are not limited thereto.

In operation 452, when the IR region feature is extracted, the liveness verification device calculates the IR liveness score using the IR region model provided the IR region feature. In operation 453, the liveness verification device calculates the color liveness score using the color verification model. In operation 480, the liveness verification device determines that the object is a real object or a fake object based on the color liveness score and the IR liveness score.

In operation 470, when at least a portion of the object is not located in the desired region or when the IR region feature is not extracted, the liveness verification device may adjust the liveness threshold for the liveness score. However, this is provided as an example only. In an example, the liveness verification device may also or alternatively adjust the liveness threshold based on an analysis of stored liveness verification history of the liveness verification device. For example, when a liveness verification of the object fails at least a preset number of times, the liveness verification device may increase the liveness threshold for consideration with a next or future liveness score that is calculated based on the respectively applied liveness model(s). In addition, if verification succeeds a predetermined number of times, then the liveness threshold may alternatively be reduced for a next of further calculated liveness score consideration.

Also, the liveness verification device may determine a first threshold as the liveness threshold in response to the target part of the object being absent in the IR image, for example, the second image of FIG. 1, FIG. 2, and/or FIG. 3. The liveness verification device may determine a second threshold, e.g., less than the first threshold, as the liveness threshold in response to a single target part being located in the IR image. The liveness verification device may determine a third threshold, e.g., less than the second threshold, as the liveness threshold in response to a plurality of target parts being located in the IR image. The liveness verification device may determine a fourth threshold, e.g., less than the third threshold, as the liveness threshold in response to detecting a pupil, e.g., a single pupil, in the IR image. The liveness verification device may determine a fifth threshold, e.g., less than the fourth threshold, as the liveness threshold in response to detecting a plurality of pupils in the second image. Here, such threshold conditions herein are not limited to these example liveness thresholds of the first through fifth thresholds, with examples existing where any of the respective thresholds having various values, probabilities, or ranges and/or where any of the respective thresholds are further dynamically adjusted during operation of the verification device.

For example, the liveness verification device may dynamically adjust a liveness threshold based on a determined level or extent at which the target part of the object is detected in the color image and the IR image and a number of times the liveness verification fails or whether the number of times meets a predetermined number of times. Thus, in an example, the liveness verification device may increase an authentication difficulty according to an increase in a number of fake attempts by dynamically adjusting the liveness threshold.

Figure 5:
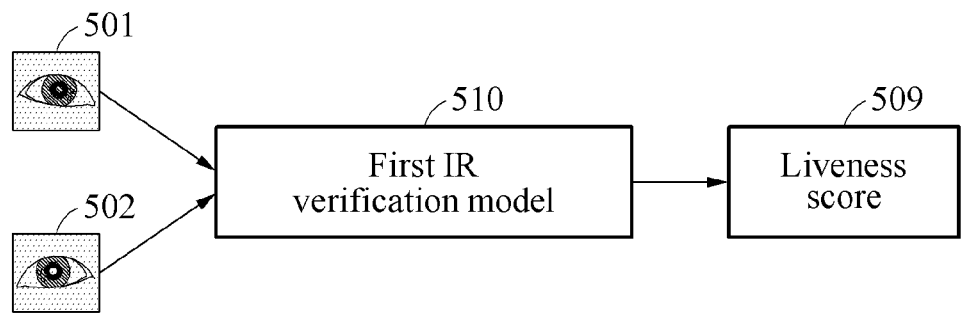
FIGS. 5 through 7 illustrate examples of an infrared (IR) verification model.
Figure 6:
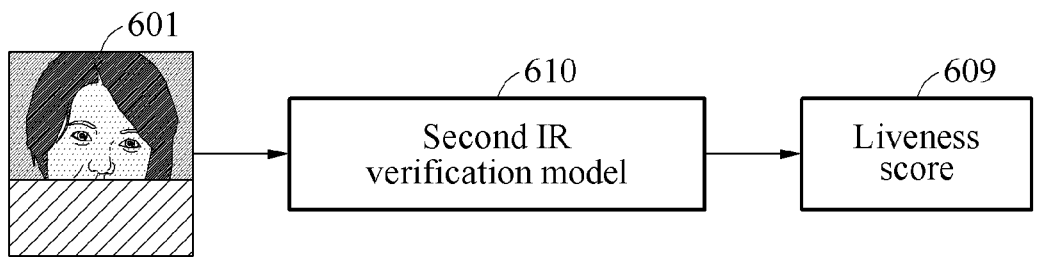
Figure 7:
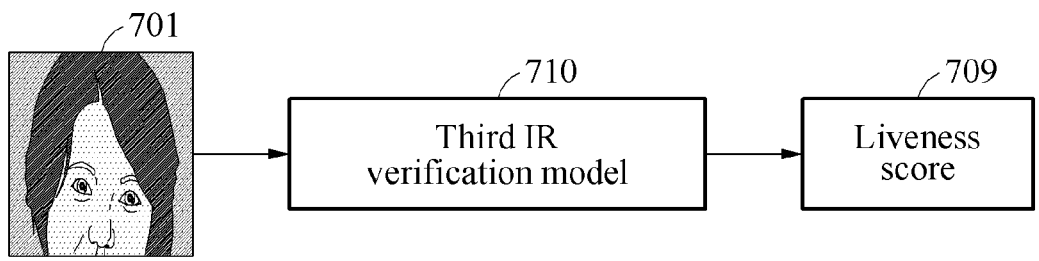

FIGS. 5 through 7 illustrate examples of an IR verification model, such as the IR verification model or IR region model of operations 341 or 351 of FIG. 3, noting that examples are not limited thereto.

The liveness verification device may calculate an IR liveness score from any one or any combination of an object region patch, a first target region patch, and a second target region patch of an IR image, based on the IR verification model.

FIG. 5 illustrates a first IR verification model 510. Referring to FIG. 5, the liveness verification device calculates an IR liveness score 509 from a first target region patch and a second target region patch of an IR image based on the first IR verification model 510. For example, the liveness verification device may verify a liveness of an object from IR patches, for example, image patches of the second image of FIG. 1, FIG. 2, and/or FIG. 3, corresponding to both eyes of the object in the IR image, for example, the second image, based on the corresponding liveness model. The first IR verification model 510 may represent a model that is trained to calculate the IR liveness score 509 from a first target patch 501, for example, an image patch corresponding to a single eye, and a second target patch 502, for example, an image patch corresponding to the other eye.

Referring to FIG. 6, the liveness verification device calculates an IR liveness score 609 from an object region patch 601 of an IR image based on a second IR verification model 610. The object region patch 601 may represent an image patch in which a remaining region excluding an object region in a desired size is padded with a determined average pixel value of the object region or a predetermined specific value. The second IR verification model 610 may represent a model that is trained to calculate the IR liveness score 609 from the padded object region patch 601.

Referring to FIG. 7, the liveness verification device calculates an IR liveness score 709 from an object region patch 701 of an IR image based on a third IR verification model 710. The object region patch 701 may represent an image patch in which an object region is scaled to a desired size. The third IR verification model 710 may represent a model that is trained to calculate the IR liveness score 709 from the scaled object region patch 701. In an example, the desired size may be a size that corresponds to the expected or trained input image size of the model, e.g., using only the object region without the remaining region, though examples are not limited thereto.

For clarity of description, FIGS. 5, 6, and 7 illustrate the first IR verification model 510, the second IR verification model 610, and the third IR verification model 710, respectively. However, these descriptions are provided as examples only. In an example, the first IR verification model 510, the second IR verification model 610, and the third IR verification model 710 may be connected to each other. For example, a liveness verification model may calculate a weighted sum of outputs of the first IR verification model 510, the second IR verification model 610, and the third IR verification model 710 as the IR liveness score, or alternatively a weighted sum of the liveness scores 509, 609, and 709. In an example where the models are connected and implemented as a neural network, for example, the respective models may be parallel hidden layers of the neural network, the outputs of which are provided to a same output layer, noting that alternative configurations are also available.

FIGS. 8A, 8B, 9, and 10 illustrate examples of a part comparison model, such as the part comparison model of operation 230 of FIG. 2, noting that examples are not limited thereto.

Figure 8A:
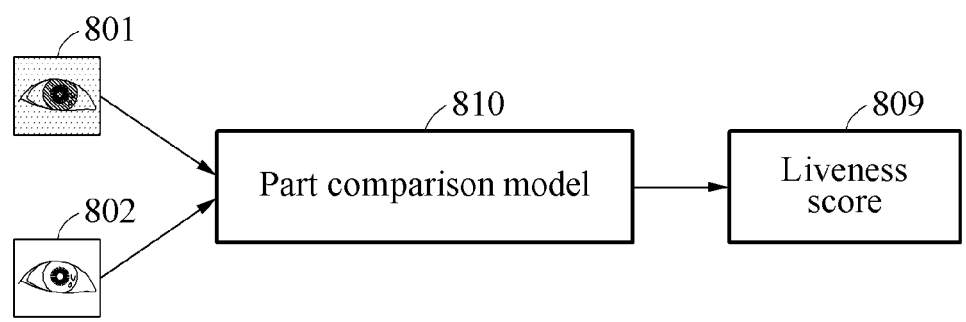
FIG. 8A, FIG. 8B, FIGS. 9, and 10 illustrate examples of a part comparison model.

FIG. 8A illustrates an example of calculating a liveness score using a part comparison model 810. For example, the liveness verification device may verify a liveness of an object from a color patch 801, for example, a first image patch, corresponding to a target part and an IR patch 802, for example, a second image patch, corresponding to the target part, based on the part comparison model 810. The part comparison model 810 may represent a model that is trained to calculate a liveness score 809 from the color patch 801 corresponding to the target part, for example, a left eye, and the IR patch 802 corresponding to the target part, for example, the same eye. The part comparison model 810 may be, for example, a neural network based part comparison model. Examples of such network structures will described in greater detail below with reference to FIGS. 9 and 10.

Figure 8B:
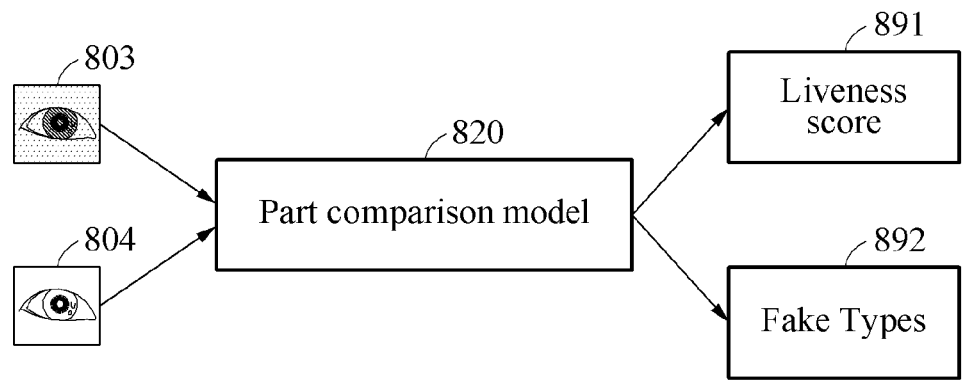

FIG. 8B illustrates another example of describing a part comparison model 820 that is further designed to output information about the considered image patches, referred to as fake information. For example, the liveness verification device may determine fake information 892 with a liveness score 891 from a first image patch 803 corresponding to a target part and a second image patch 804 corresponding to the target part based on the part comparison model 820. The part comparison model 820 may represent a model that is trained to output the liveness score 891 and the fake information 892 from the first image patch 803 and the second image patch 804.

The fake information 892 may include an indication of a type of fake image represented by either or both of the image patches. The fake types may include, for example, an object printed on a photo, an object displayed on a screen, a silicon carved object or mask, and a three-dimensionally (3D) printed object. The fake information 892 may be, for example, a label indicating one of the fake types.

The IR verification model of operations 341 and 351 of FIG. 3 may be a model in which one of examples of FIGS. 5, 6, and 7, and examples of FIGS. 8A and 8B are individually or partially combined. Also, the IR verification model of operations 341 and 351 may be a model acquired through ensemble of the models of FIG. 5 and FIGS. 8A and 8B and FIG. 6 or 7.

Figure 9:
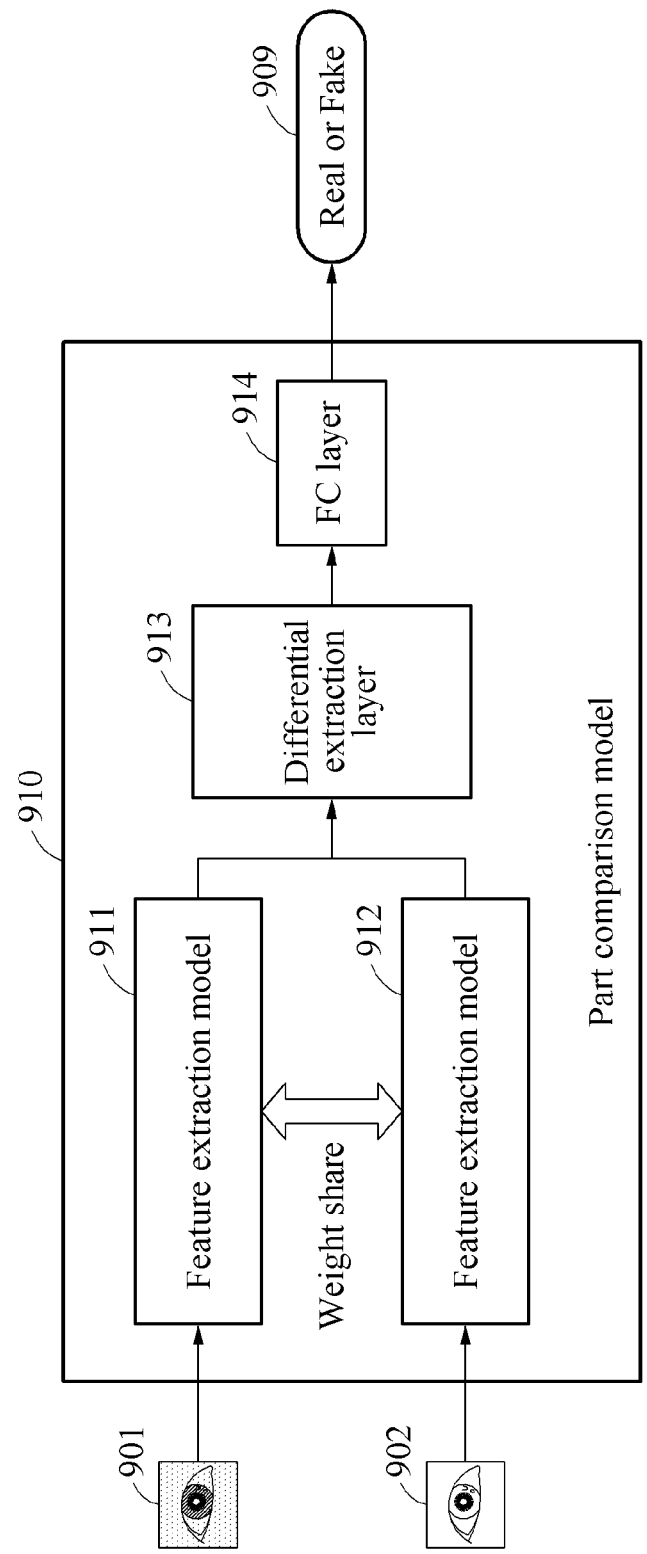

FIG. 9 illustrates an example of a part comparison model 910, such as the part comparison models 810 and 820 of FIGS. 8A and 8B, noting that examples are not limited thereto. Referring to FIG. 9, the liveness verification device extracts a color part feature, for example, a first part feature, from a color patch 901, for example, a first image patch, based on a feature extraction model 911 of the part comparison model 910. The liveness verification device extracts an IR part feature, for example, a second part feature, from an IR patch 902, for example, a second image patch, based on a feature extraction model 912. In an example, the first image patch and the second image patch may be respective patches of a first image and the second image, such as the first image of FIG. 1, FIG. 2, and/or FIG. 3. Each of the feature extraction models 911 and 912 may represent a model that is trained to output a part feature from an image patch corresponding to a target part. The part feature may refer to, for example, a feature vector as a feature abstracted from an input image. In an example, the two feature extraction models 911 and 912 may be trained models that have the same parameters, for example, the same connection weights. The two feature extraction models 911 and 912 may also be trained together to result in the same parameters. Accordingly, with each having the same parameters, the two feature extraction models 911 and 912 may be configured as having the same machine learning structure.

The liveness verification device verifies a liveness of an object based on a difference between a color part feature and an IR part feature respective resulting from the feature extraction model 911 and the feature extraction model 912. For example, the liveness verification device may calculate liveness information 909 by inputting an IR part feature and a color part feature calculated from the feature extraction models 911 and 912, respectively, to a differential extraction layer 913 and a fully connected (FC) layer 914 of a corresponding example neural network structure, as a non-limiting structural example. In such a neural network structure, for example, there may be at least two input layers that respectively connect, e.g., directly connect, to feature extraction model 911 and feature extraction model 912, the outputs of which may be then both provided to the subsequent differential extraction layer 913. The liveness result information 909 may include, for example, a liveness score as information indicating whether the object is real or fake.

Figure 10:
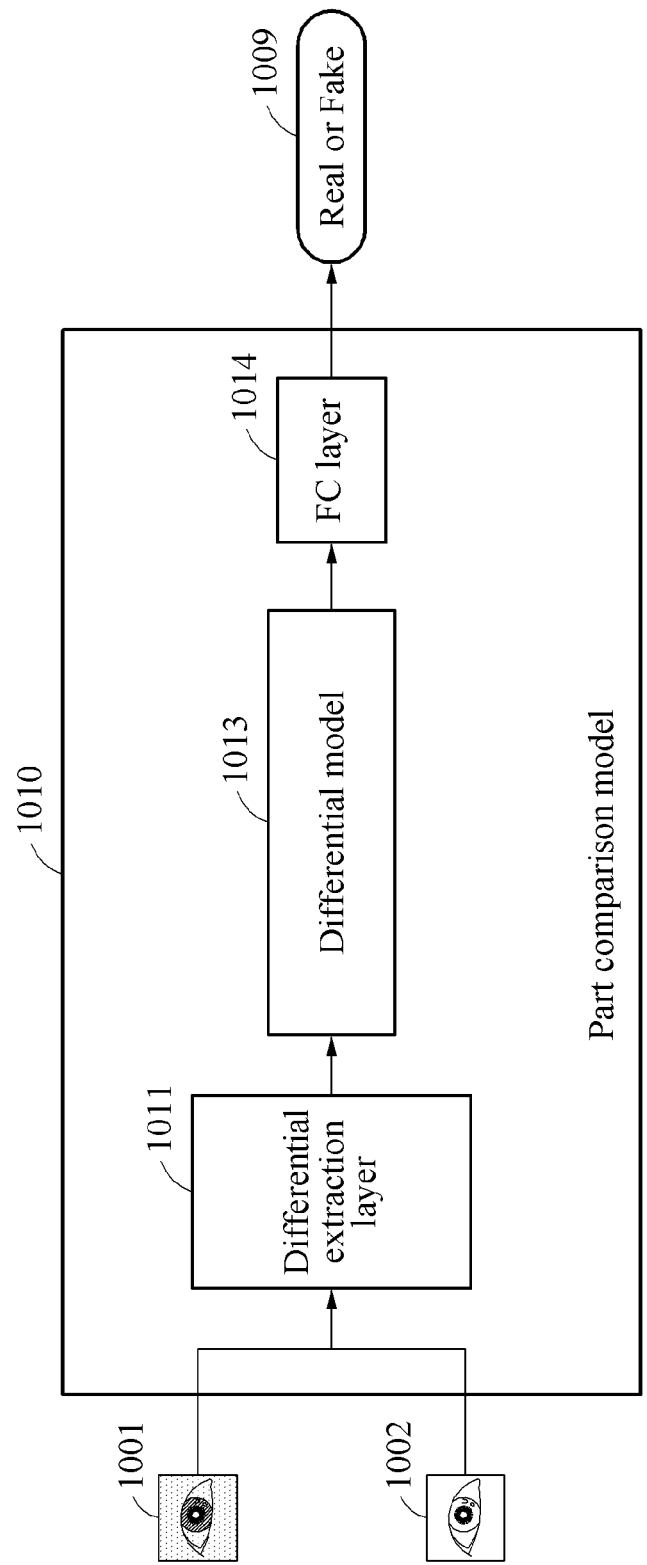

FIG. 10 illustrates an example of a part comparison model 1010, such as the part comparison models 810 and 820 of FIGS. 8A and 8B, noting that examples are not limited thereto. Referring to FIG. 10, the liveness verification device verifies a liveness of an object from differential information between a color patch 1001, for example, a first image patch, and an IR patch 1002, for example, a second image patch, based on the part comparison model 1010. The first image patch and the second image patch may be respective patches of a first image and a second image, such as the first image and the second image of FIG. 1, FIG. 2, and/or FIG. 3. The liveness verification device extracts the differential information between the color patch 1001 and the IR patch 1002 based on a differential extraction layer 1011. The differential information may refer to information indicating a difference between the color patch 1001 and the IR patch 1002. For example, the differential information may indicate a pixel value difference between a Gaussian filtered color patch and a Gaussian filtered IR patch. However, it is provided as an example only and other filtering may be applied.

The liveness verification device generates liveness information 1009 by inputting the differential information to a differential model 1013 and by propagating an output of the differential model 1013 to a fully connected (FC) layer 1014. Similar to the example of FIG. 9, the liveness information 1009 may include a liveness score. Also, the differential extraction layer 1011, the differential model 1013, and the FC layers may be configured as respective hidden layers of a neural network structure, for example. In such a neural network structure, for example, there may be at least two input layers that each respectively connect to the differential extraction layer 1011.

Figure 11:
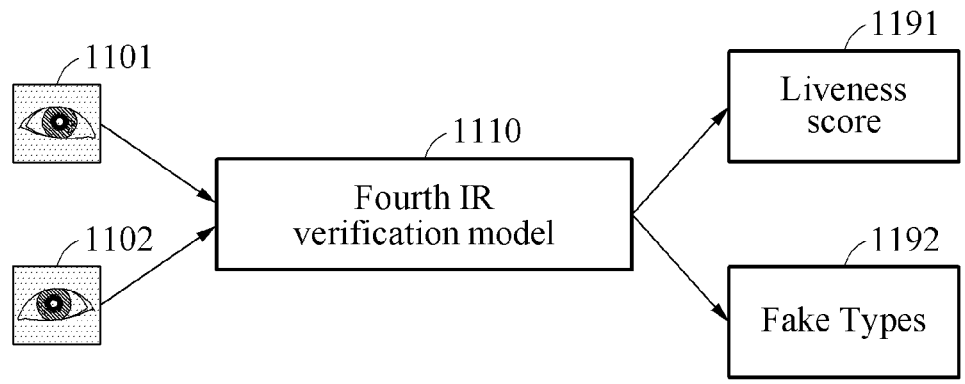
FIGS. 11 through 13 illustrate examples of an IR verification model.
Figure 12:
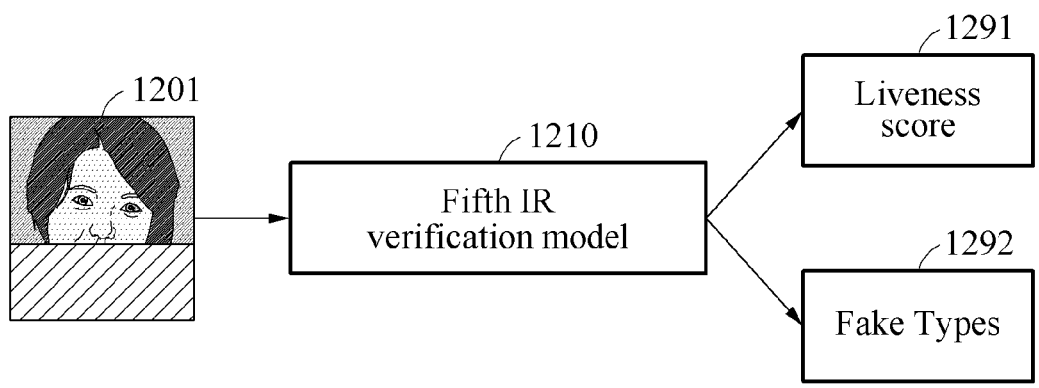
Figure 13:
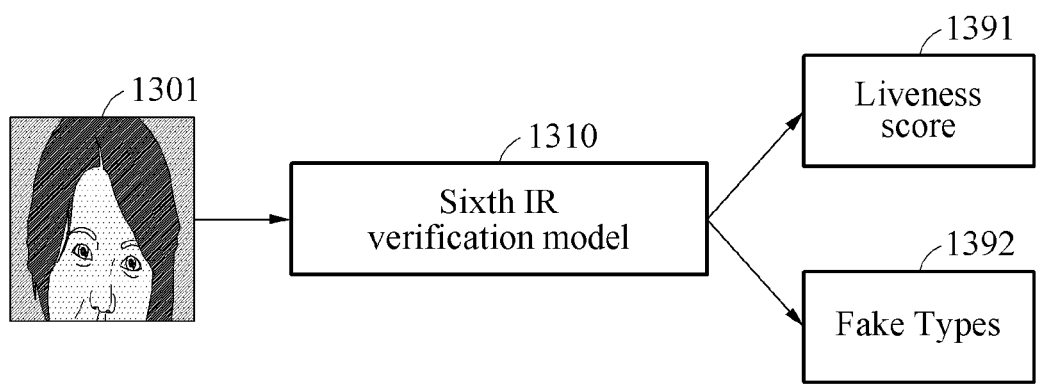

FIGS. 11 through 13 illustrate examples of an IR verification model.

Similar to the part comparison model 820 of FIG. 8B configured to output fake information and a liveness score, examples also include any of the above other liveness models being configured to output fake information with corresponding liveness scores. For example, the liveness verification device may determine fake information with a liveness score of an object from a color image and an IR image based on a liveness model.

For example, referring to FIG. 11, the liveness verification device determines an IR liveness score 1191 and fake information 1192 from a first target region patch 1101 and a second target region patch 1102 of an IR image based on a fourth IR verification model 1110. The fourth IR verification model 1110 may represent a model that is trained to output the IR liveness score 1191 and the fake information 1192 from the first target region patch 1101 and the second target region patch 1102.

The above description related to the fake information of FIG. 8B is also applicable to the face information 1192.

Referring to FIG. 12, the liveness verification device determines an IR liveness score 1291 and fake information 1292 from a padded object region patch 1201, as explained above with respect to FIG. 6, of an IR image based on a fifth IR verification model 1210. The fifth IR verification model 1210 may represent a model that is trained to output the IR liveness score 1291 and the fake information 1292 from the padded object region patch 1201.

Referring to FIG. 13, the liveness verification device determines an IR liveness score 1391 and fake information 1392 from a scaled object region patch 1301, such as explained above with respect to FIG. 7, of an IR image based on a sixth IR verification model 1310. The sixth IR verification model 1310 may represent a model that is trained to output the IR liveness score 1391 and the fake information 1392 from the scaled object region patch 1301.

Figure 14:
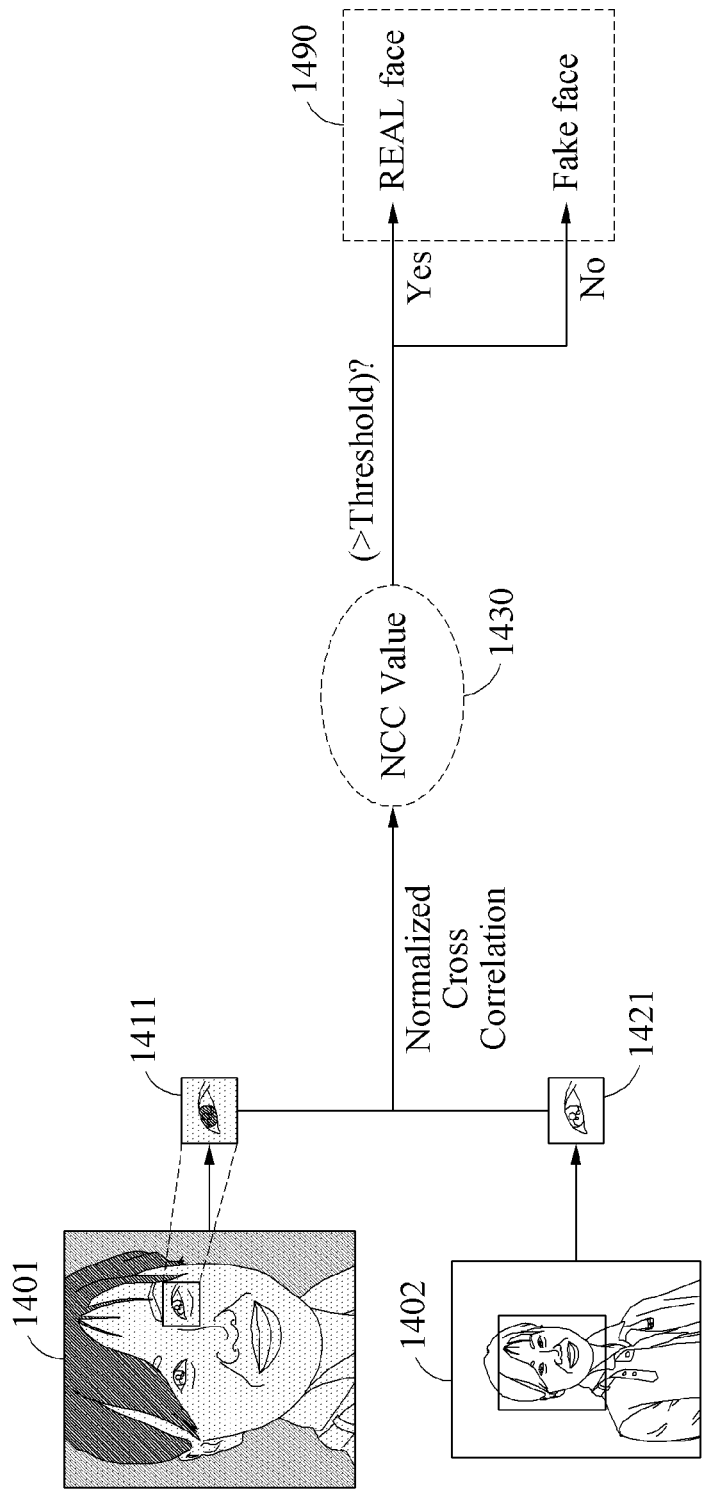
FIG. 14 illustrates an example of a part comparison.

FIG. 14 illustrates an example of a part comparison.

Referring to FIG. 14, the liveness verification device may verify a liveness of an object based on a determined correlation level between a color patch 1421, for example, a first image patch, corresponding to a target part extracted from a color image 1402, for example, a first image, and an IR patch 1411, for example, a second image patch, determined in correspondence to the color patch 1421 in an IR image 1401, for example, a second image. The first image and the second image may correspond to the first and second images of FIG. 1, FIG. 2, and/or FIG. 3, for example.

For example, the liveness verification device may calculate a normalized cross correlation (NCC) value 1430 between the color patch 1421 and the IR patch 1411. The liveness verification device determines liveness information 1490 by determining whether the NCC value 1430 meets a threshold. For example, the liveness verification device may determine that the object is a real face if the NCC value 1430 meets, e.g., is greater than, the threshold, and may determine that the object is a fake face if the NCC value 1430 fails to meet, e.g., is less than or equal to, the threshold. In an alternative example, when the NCC value 1430 is greater than a specific threshold, the liveness verification device may determine that the object is a fake face. That is, examples exist where the threshold condition is variously set.

Figure 15:
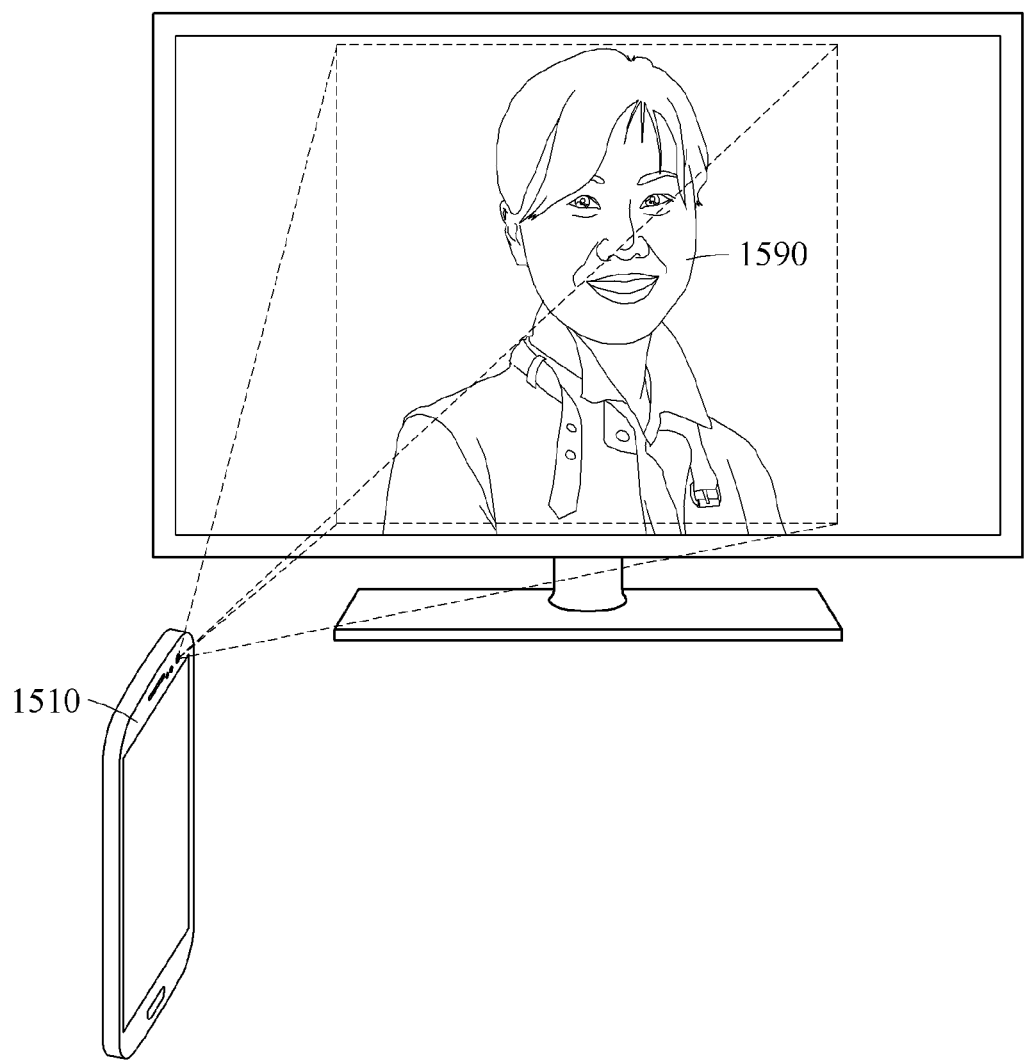
FIGS. 15 and 16 illustrate examples of attempting to fake a user authentication.
Figure 16:
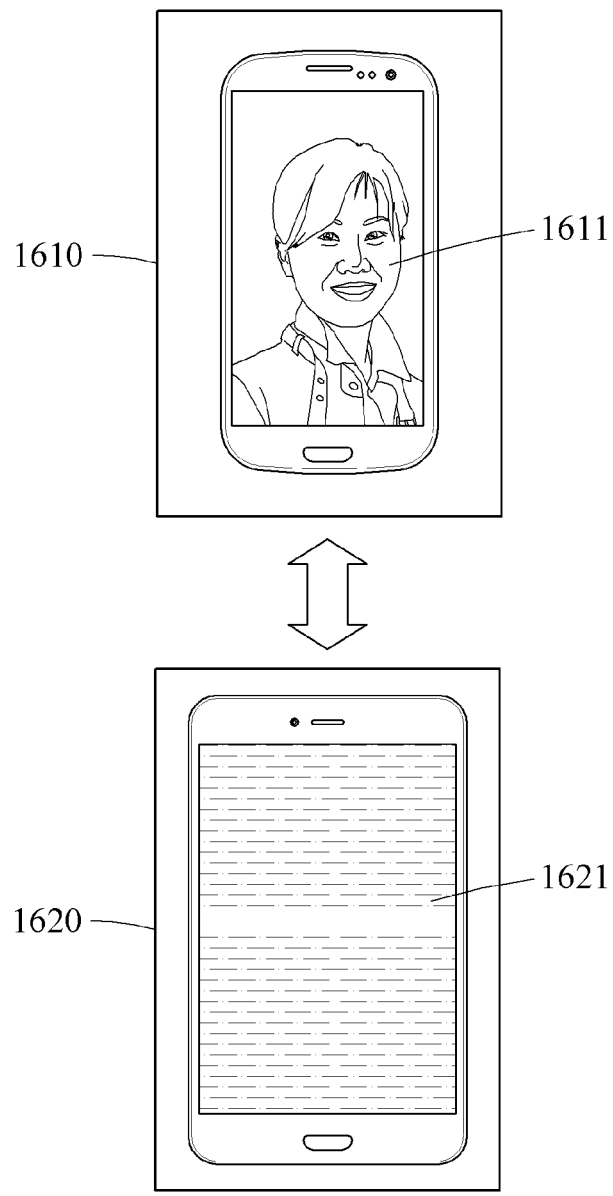

FIGS. 15 and 16 illustrate examples of attempting to fake a user authentication.

Among the aforementioned fake types, an object displayed or projected on a screen or display is described with reference to FIG. 15. A forger may attempt a fake by photographing a shape of the fake object 1590 displayed on the screen using a liveness verification device 1510. For example, the forger may use the displayed or projected fake object 1590 of a fake device as the input or acquired image of the liveness verification device 1510, e.g., as captured through a front camera of the liveness verification device 1510.

Referring to FIG. 16, an object 1611 may be present on a color image 1610 as if the object 1611 is normally captured by a liveness verification device. However, the object 1611 is absent in a correspondingly captured IR image 1620, and thus only a fake device 1621 is present on the IR image 1620. Accordingly, the liveness verification device may accurately verify a liveness (i.e., failure of liveness or fake determination) of the object 1610 based on the IR image 1620 by performing any or any combination of the operations described with reference to FIGS. 1 through 14.

Figure 17:
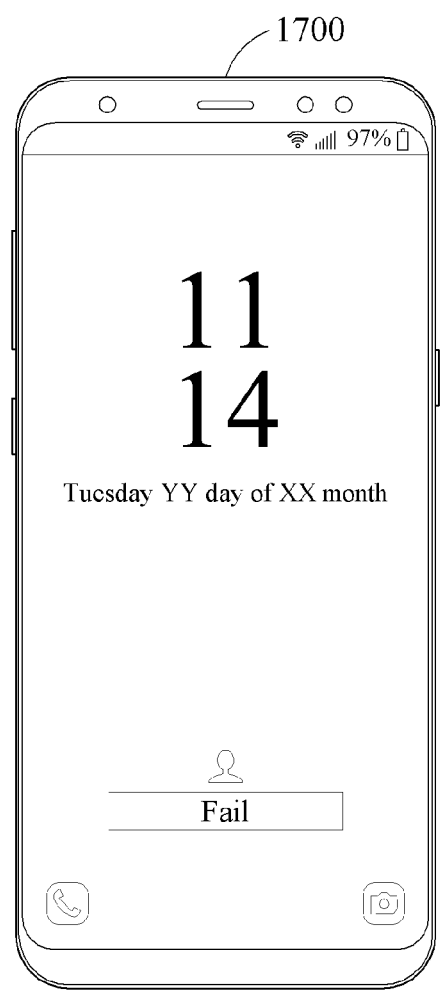
FIGS. 17 and 18 illustrate examples of applying a liveness verification.
Figure 18:
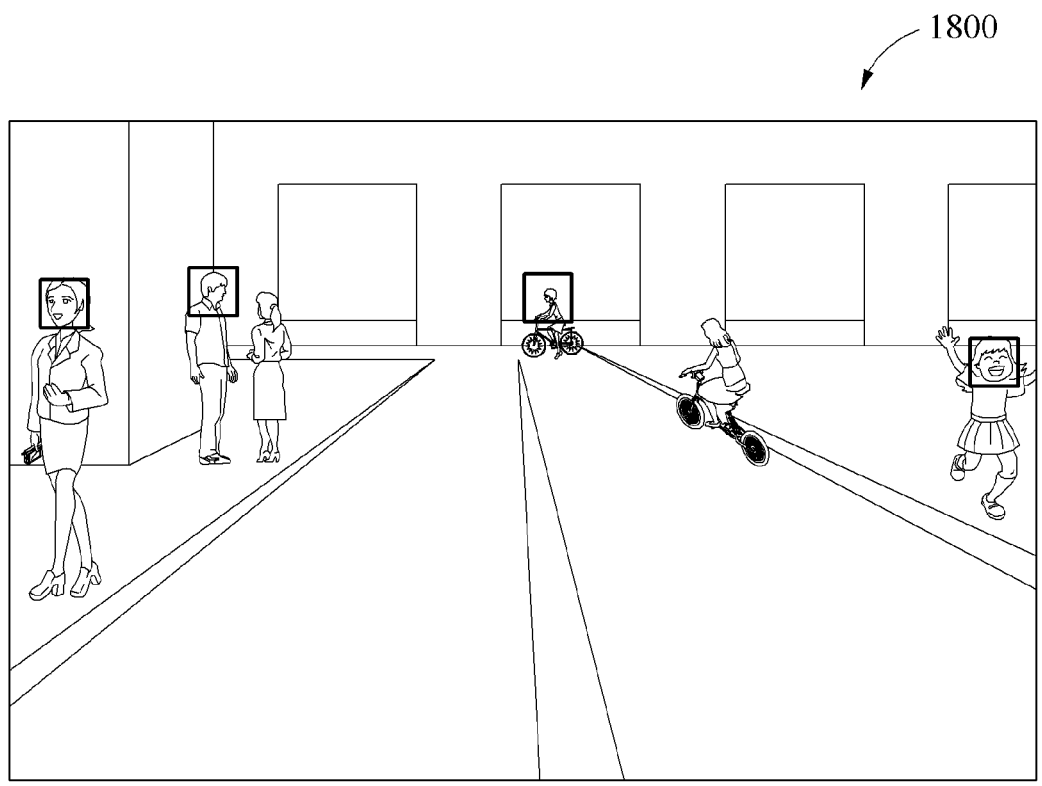

FIGS. 17 and 18 illustrate examples of applying a liveness verification.

FIG. 17 illustrates an example of a computing device 1700, which may include or be representative of the liveness verification device. In one example, the computing device 1700 may perform a user authentication on a user that is to access the computing device 1700. For example, when the user attempts the user authentication on the computing device 1700 to remove or change a locked state of, that is, unlock the computing device 1700, the computing device 1700 may determine whether to remove or change the locked state of the computing device 1700 by capturing a facial image of the user using an image acquiring apparatus such as a camera and by analyzing the captured facial image.

To unlock the computing device 1700, the user may photograph a face of the user, e.g., through a camera of the computing device 1700. An invalid user may attempt to remove the locked state by triggering an erroneous authentication of the computing device 1700 using spoofing techniques. For example, the invalid user may provide or position in front of the camera a photo on which a face of a valid user is printed or a model having a facial shape of a permitted user in an attempt to trigger an authentication of the invalid user. The liveness verification device may prevent the erroneous authentication based on such spoofing techniques, by performing any or any combination of the operations described with reference to FIGS. 1 through 14.

In one example, if the liveness verification device determines that a verification target has a liveness, for example, that the verification target is live, the computing device 1700 may then perform a user authentication process. For example, either using the already captured first and/or second images or image patches features may be extracted from the same, or new images, and compared to registered user features, and authorization given when the extracted are determined to sufficiently match registered user features. If the user authentication succeeds, the user may successfully unlock the computing device 1700. On the contrary, if the user authentication fails, the user may not unlock the computing device 1700 and the computing device 1700 may continuously operate in the locked state. In an example, if the liveness verification device determines that the verification target does not have a liveness, for example, that the verification target is faked, the computing device 1700 may continuously operate in the locked state without proceeding to an operation of performing the user authentication.

FIG. 18 illustrates an example of a security management system 1800, for example, a closed-circuit television (CCTV), to which the liveness verification device is applied. For example, in a situation in which quantity of light is limited such as at night, the liveness verification device may detect a disguise or mask by silicon carving or 3D printing by verifying a liveness of an object through a combination of a color image and an IR image of the object, by performing any or any combination of the operations described with reference to FIGS. 1 through 14.

FIGS. 19 and 20 are block diagrams illustrating examples of a liveness verification device.

FIG. 19 illustrates an example of a liveness verification device 1900.

Referring to FIG. 19, an image acquirer 1910 acquires an input image that includes a first image and a second image. The first image and the second image may each be, for example, any of color image, an IR image, a black-and-white image, and a depth image. The image acquirer 1910 may include a color sensor and an IR sensor. In an example, the color sensor and the IR sensor may be separate from each other. Also, the color sensor and the IR sensor may have different FOVs, as a non-limiting example. The image acquirer 1910 may include a single image sensor in which the color sensor and the IR sensor are integrated. The color image and the IR image acquired using the integrated image sensor may have the same FOV, for example.

A processor 1920 selects a liveness model based on an object part that is detected in a color image and verifies a liveness of an object from any one or any combination of the first image and second image based on the selected liveness model.

As another example, the processor 1920 extracts a color patch corresponding to the object part from the color image and an IR patch corresponding to the object part from the IR image. The processor 1920 verifies the liveness of the object based on differential information between the color patch and the IR patch.

An operation of the processor 1920 is not limited thereto and the processor 1920 may perform any or any combination of the operations described with reference to FIGS. 1 through 14. Further, an operation performed by the processor 1920 may be modified in various examples. As noted above, various operations of FIGS. 1 through 14 may be variously combined and thereby performed by the liveness verification device 1900. In further examples, the liveness verification device 1900 may be configured to perform further operations, such as the above discussed authentication operation, as well as other operations and functionalities of a computing or electronic device when the liveness verification device 1900 is the computing or electronic device.

In an example, the liveness verification device 1900 may be robust over previous approaches, in limited light environments, as well as even in an outdoor environments with strong sunlight, by verifying the liveness based on both of the IR image and the color image, and thus provide further technological improvements over previous liveness determinations based on single patch or single image types.

FIG. 20 illustrates an example of a liveness verification device 2000.

Referring to FIG. 20, the liveness verification device 2000 includes a processor 2010, a memory 2020, a camera 2030, a storage device 2040, an input device 2050, an output device 2060, and a network interface 2070. The processor 2010, the memory 2020, the camera 2030, the storage device 2040, the input device 2050, the output device 2060, and the network interface 2070 communicate with each other through a communication bus 2080.

The processor 2010 executes functions and instructions to be executed in the liveness verification device 2000. For example, the processor 2010 may process the instructions stored in the memory 2020 or the storage device 2040. In an example, the processor 2010 may be the same processor as the processor 1920 of FIG. 19. The processor 2010 may perform one or more or any combination of operations described with reference to FIGS. 1 through 14. The processor 2010 may control an indication, e.g., explicit and/or implicit, of the results of the liveness verification. For example, as described below, such explicit indications may be made through the output device 2060, while implicit indications may be made through further operation of the liveness verification device 2000, such as the aforementioned authentication operation or through the resultant example unlocking of the liveness verification device 2000, as a non-limiting example.

The memory 2020 stores information for a liveness verification. The memory 2020 includes a non-transitory computer-readable medium or a computer-readable storage device. The memory 2020 stores instructions to be executed by the processor 2010 and also stores relevant information during execution of software or an application by the liveness verification device 2000.

The camera 2030 acquires a still image, a video image, or all of the still image and the video image in which a target of a liveness verification is present. In a non-limiting example, the camera 2030 may be the same as the image acquirer 1910 of FIG. 19.

The storage device 2040 includes a non-transitory computer-readable medium or a computer-readable storage device. In one example, the storage device 2040 stores a relatively large amount of information compared to that of the memory 2020 and stores information for a long period. For example, the storage device 2040 may include a magnetic hard disk, an optical disc, a flash memory, an electrically programmable read only memory (EPROM), a floppy disk or other type of nonvolatile memory known in the art. Either or both of the memory 2020 and the storage device 2040 store the respective models described herein, such as through the storing of the described trained parameters of the respective models.

The input device 2050 receives an input from a user through a tactile sense, a video, an audio, or a touch input. For example, the input device 2050 may include a device capable of detecting an input from a keyboard, a mouse, a touchscreen, a microphone, or a user, and transferring the detected input to the liveness verification device 2000.

The output device 2060 may provide a user with an explicit indication of the successfulness of the liveness determination of liveness verification device 2000 through a visual channel, an auditory channel, or a tactile channel, as well as implicit indications of the result such as displaying of an unlocked user interface of the liveness verification device 2000, authorizing of electronic payments, or auto-fill or password access, as a non-limited examples. The output device 2060 may include, for example, a display, a touchscreen, a speaker, a vibration generator, or another type of device capable of providing the output to the user. The output device 2060 may also be configured to output control signals for controlling apparatuses or systems outside of the liveness verification device 2000, such that an implicit indication may be the provisions of user physical access to a locked or secure area. The network interface 2070 may communicate with an external device through a wired network or a wireless network. In an example, the network interface 2070 may request and/or receive updates to any of the stored models, as well as share results of the liveness determinations and/or authentication operations described herein to other computing or electronic devices or other liveness verification device(s) 2000.

The liveness verification devices, computing and electronic devices, cameras, color image sensors, IR image sensor, integrated image sensors, liveness verification device 1510, computing device 1700, liveness verification device 1900, image acquirer 1910, processor 1920, liveness verification device 2000, processor 2010, memory 2020, camera 2030, storage device 2040, input device 2050, output device 2060, network interface 2070, and communication bus 2080 and other apparatuses, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device comprising:
   one or more sensors configured to acquire a first image and a second image;
   a memory configured to store a plurality of machine learning liveness detection models, wherein each of the plurality of machine learning liveness detection models are pretrained to determine whether a corresponding object, within a corresponding one or more images, is a live or non-live corresponding object; and
   a processor configured to:
      select multiple machine learning liveness detection models, from among the plurality of machine learning liveness detection models, based on respective analyses of the first image and/or the second image; and
      determine, using the selected multiple machine learning liveness detection models, whether an object is a live object or a non-live object based on the first image and/or the second image.

2. The device of claim 1, wherein, for the selecting of the multiple machine learning liveness detection models, the processor is configured to select a first machine learning liveness detection model and a second machine learning liveness detection model in response to respectively detecting, in the analyses, a respective target part or a respective object part in the first image and in the second image.

3. The device of claim 1,
   wherein, for the selecting of the one or more machine learning liveness detection models, the processor is configured to select a part comparison machine learning model in response to a respective detection of a respective target part or a respective object part, which includes the respective target part and other parts, in the first image and in the second image, and
   wherein, for the determination of whether the object is the live object or whether the object is the non-live object, the processor is configured to perform the determination of whether the object is the live object or whether the object is the non-live object using the part comparison machine learning model provided a first image patch of an eye of the first image and a second image patch of an eye of the second image.

4. The device of claim 3, wherein the first image is a color image and the second image is an Infrared image.

5. The device of claim 3, wherein each respective target part is an eye target part, and each respective object part is a face or portion of the face including facial parts in addition to the eye target part.

6. The device of claim 3, wherein, for the selecting of the part comparison machine learning model, the processor is configured to select the part comparison model in response to the respective target part in the first image being determined located in a region of the first image.

7. The device of claim 1, wherein the multiple machine learning liveness detection models include at least one second machine learning liveness detection model respectively configured to calculate at least one second liveness score in consideration of any one or any combination of any two or more of an object region patch of the second image, a first target region patch of the second image, and a second target region patch of the second image, and
   the processor is further configured to perform the determining of whether the object is the live object or whether the object is the non-live object in further consideration of the at least one second liveness score.

8. The device of claim 1, wherein the multiple machine liveness detection models include at least one first machine learning liveness detection model respectively configured to calculate at least one first liveness score in consideration of any one or any combination of any two or more of an entire region patch of the first image, an object region patch of the first image, and/or a determined region of interest (ROI) patch of the first image, and
   the processor is further configured to perform the determining of whether the object is the live object or whether the object is the non-live object in further consideration of the at least one first liveness score.

9. The device of claim 1,
   wherein the multiple machine learning liveness detection models include a first machine learning liveness detection model and a second machine learning liveness detection model,
   wherein, for the determining of whether the object is the live object or whether the object is the non-live object, the processor is configured to determine a liveness of the object based on any one or any combination of a first liveness score and a second liveness score, and
   wherein the first liveness score is calculated based on the first machine learning liveness detection model from a first image patch corresponding to an object part or a target part detected in the first image, and the second liveness score is calculated based on the second machine learning liveness detection model from a second image patch corresponding to the object part or the target part detected in the second image.

10. The device of claim 9, wherein, for the determining of the liveness of the object, the processor is configured to determine the liveness of the object based on the first liveness score and the second liveness score.

11. The device of claim 1,
wherein, for the determining of whether the object is the live object or whether the object is the non-live object, the processor is configured to determine, based on a part comparison model, a liveness of the object from a first image patch corresponding to a target part and a second image patch corresponding to the target part,
wherein the part comparison model is one of the one or more machine learning liveness detection models, and
wherein the first image patch and the second image patch respectively include different image modality information.

12. The device of claim 11, wherein, with respect to the different image modality information, the first image patch includes visual spectrum image information and the second image patch includes non-visual spectrum image information, the first image patch includes color image information and the second image patch includes non-color image information, or the first image patch includes light spectrum information and the second image patch is a depth image patch.

13. The device of claim 11, wherein, for the determining of the liveness of the object, the processor is further configured to:
extract a first part feature from the first image patch based on a feature extraction model of the part comparison model;
extract a second part feature from the second image patch based on the feature extraction model; and
determine whether the object is the live object or whether the object is the non-live object based on a difference between the extracted first part feature and the extracted second part feature.

14. The device of claim 11, wherein, for the determining of whether the object is the live object or whether the object is the non-live object, the processor is configured to determine, based on the part comparison model, a liveness of the object from differential information between the first image patch and the second image patch.

15. The device of claim 1, wherein, for the determining of whether the object is the live object or whether the object is the non-live object, the processor is configured to determine a liveness of the object based on a determined correlation level between a first image patch corresponding to a target part extracted from the first image and a second image patch determined in response to the first image patch.

16. The device of claim 1, wherein the one or more sensors comprises:
a color image sensor configured to capture a color image as the first image; and
an infrared (IR) image sensor configured to capture an IR image as the second image, and
wherein, for the selecting of the multiple machine learning liveness detection models, the processor is configured to select a color verification model, as one of the multiple machine learning liveness detection models, in response to detecting a target part in the color image, and select an IR region model, as another one of the multiple machine learning liveness detection models, in response to the target part being located outside a region of the color image and at least a portion of the object being located in a corresponding region in the IR image.

17. The device of claim 16, wherein, for the selecting of the color verification model, the processor is configured to, selectively, dependent on a detecting of a pupil of the object in the second image, perform the selecting of the color verification model or perform a selecting of a pupil model without selecting the color verification model, and
the processor is configured to, when the pupil model is selected, determine whether the object is the live object or whether the object is the non-live object from a pupil patch corresponding to the pupil based on the pupil model.

18. The device of claim 17, wherein, in response to the pupil of the object not being detected in the second image, the processor is configured to perform the selecting of the color verification model and a selecting of an IR verification model, as still another one of the multiple machine learning liveness detection models, and determine whether the object is the live object or whether the object is the non-live object based on image patches from both the first image and the second image.

19. The device of claim 18, wherein, for the selecting of the IR region model, the processor is configured to:
when the at least portion of the object is determined to be located in the corresponding region of the IR image, select multiple machine learning liveness detection models in the selecting of the multiple machine learning liveness detection models by performing the selecting of the IR region model in combination with the selecting of the color verification model or selecting of another color verification model; and
when the at least portion of the object is determined to not be located in the corresponding region of the IR image, select a select color machine learning liveness detection model in the selecting of the multiple machine learning liveness detection models by selecting the color verification model or selecting the other color verification model without selecting the IR region model.

20. A mobile device comprising:
one or more sensors configured to acquire a first image and a second image;
a memory configured to store a plurality of machine learning liveness detection models; and
a processor configured to select one or more machine learning liveness detection models, from among the plurality of machine learning liveness detection models, based on respective analyses of the first image and/or the second image and to determine, using the selected one or more machine learning liveness detection models, whether an object is a live object based on the first image and/or the second image,
wherein, for the selecting of the one or more machine learning liveness detection models, the processor is configured to select a pupil model, as one of the one or more machine learning liveness detection models, in response to detecting a pupil of the object in the second image, and
for the determining of whether the object is the live object, the processor is configured to determine a liveness of the object from a pupil patch corresponding to the pupil based on the pupil model.

* * * * *